United States Patent
Yao et al.

(10) Patent No.: US 11,985,608 B2
(45) Date of Patent: May 14, 2024

(54) POWER CONTROL METHOD AND APPARATUS, AND ELECTRONIC APPARATUS

(71) Applicant: ZTE CORPORATION, Guangdong (CN)

(72) Inventors: Ke Yao, Guangdong (CN); Bo Gao, Guangdong (CN); Yu Ngok Li, Guangdong (CN); Zhaohua Lu, Guangdong (CN); Shengxiang Guo, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 309 days.

(21) Appl. No.: 17/421,890

(22) PCT Filed: Jan. 10, 2020

(86) PCT No.: PCT/CN2020/071398
§ 371 (c)(1),
(2) Date: Jul. 9, 2021

(87) PCT Pub. No.: WO2020/143761
PCT Pub. Date: Jul. 16, 2020

(65) Prior Publication Data
US 2022/0116891 A1    Apr. 14, 2022

(30) Foreign Application Priority Data
Jan. 11, 2019    (CN) .......................... 201910028183.0

(51) Int. Cl.
*H04W 52/04* (2009.01)
*H04W 52/36* (2009.01)

(52) U.S. Cl.
CPC .................. *H04W 52/367* (2013.01)

(58) Field of Classification Search
CPC ............. H04W 52/367; H04W 52/146; H04W 52/325; H04W 52/365; H04W 52/42;
(Continued)

(56) References Cited

U.S. PATENT DOCUMENTS

| | | | |
|---|---|---|---|
| 2015/0189606 A1* | 7/2015 | Kim .................... | H04W 52/146 455/552.1 |
| 2015/0341091 A1* | 11/2015 | Park .................... | H04B 7/0456 375/267 |

(Continued)

FOREIGN PATENT DOCUMENTS

| | | |
|---|---|---|
| CN | 102771173 A | 11/2012 |
| CN | 103069870 A | 4/2013 |

(Continued)

OTHER PUBLICATIONS

ZTE. "Enhancements on UL beam management" 3GPP TSG RAN WG1 Meeting #96bis, R1-1904028, Apr. 8, 2019, sections 1-3.
(Continued)

*Primary Examiner* — Andrew Wendell
(74) *Attorney, Agent, or Firm* — KDW Firm PLLC

(57) ABSTRACT

Provided are a power control method and apparatus, and an electronic device, where the method includes: determining at least one piece of maximum transmit power-related information; and sending the at least one piece of maximum transmit power-related information to a first communication node, where each of the at least one piece of maximum transmit power-related information is related to a beam or a beam group.

18 Claims, 3 Drawing Sheets

Determine one or more pieces of maximum transmit power-related information — S202

Send the one or more pieces of maximum transmit power-related information to a first communication node, where the maximum transmit power-related information is related to a beam or a beam group — S204

(58) Field of Classification Search
CPC ... H04W 52/08; H04W 52/10; H04W 52/242; H04W 52/04; H04W 52/02; H04B 7/18543

See application file for complete search history.

(56) References Cited

U.S. PATENT DOCUMENTS

| | | | |
|---|---|---|---|
| 2018/0115957 A1* | 4/2018 | Lin | H04W 52/365 |
| 2018/0368081 A1 | 12/2018 | Akkarakaran et al. | |
| 2019/0104477 A1* | 4/2019 | MolavianJazi | H04W 72/23 |
| 2019/0327695 A1* | 10/2019 | Ren | H04W 72/0473 |
| 2019/0387483 A1* | 12/2019 | Lee | H04W 52/42 |
| 2020/0045563 A1* | 2/2020 | Luo | H04W 48/18 |
| 2020/0145079 A1* | 5/2020 | Marinier | H04B 7/0408 |
| 2020/0214018 A1* | 7/2020 | Venugopal | H04B 7/088 |
| 2020/0344701 A1* | 10/2020 | Kato | H04W 52/367 |
| 2021/0067226 A1* | 3/2021 | Nilsson | H04L 5/0051 |
| 2021/0320710 A1* | 10/2021 | Koskela | H04B 7/022 |

FOREIGN PATENT DOCUMENTS

| | | |
|---|---|---|
| CN | 107979869 A | 5/2018 |
| CN | 108064078 A | 5/2018 |
| CN | 108924920 A | 11/2018 |
| CN | 109088661 A | 12/2018 |
| WO | 2018026223 A1 | 2/2018 |
| WO | 2018175784 A1 | 9/2018 |

OTHER PUBLICATIONS

ZTE. "Enhancements on UL beam management" 3GPP TSG RAN WG1 Meeting #97, R1-1906251, May 13, 2019, sections 1-3.

International Search Report for the International Patent Application No. PCT/CN2020/071398, dated Mar. 31, 2020, 2 pages.

The First Search Report for Chinese Patent Application No. 201910028183.0 (six (6) pages).

The First Office Action for Chinese Patent Application No. 201910028183.0 (14 pages).

Vivo, "Remaining issues on NR UL power control", 3GPP TSG RAN WG1 Meeting #90bis R1-1717508, Prague, CZ, Oct. 9-13, 2017.

The Extended European Search Report dated Sep. 15, 2022, for European Patent Application No. 22151884.8 (eight (8) pages).

Search Report for Chinese Application No. 2019100281830, dated May 31, 2023, 8 pages.

Office Action for Chinese Application No. 2019100281830, dated May 31, 2023, 14 pages.

* cited by examiner

POWER CONTROL METHOD AND APPARATUS, AND ELECTRONIC APPARATUS

CROSS-REFERENCE TO RELATED APPLICATIONS

This is a National Stage Application filed under 35 U.S.C. 371 based on International Patent Application No. PCT/CN2020/071398, filed on Jan. 10, 2020, which claims priority to Chinese Patent Application No. 201910028183.0 filed on Jan. 11, 2019, the disclosures of both of which are incorporated herein by reference in their entireties.

TECHNICAL FIELD

The present disclosure relates to the field of communications and, in particular, to a power control method and apparatus, and an electronic device.

BACKGROUND

The fifth-generation mobile communication system needs to support different types of application scenarios, among which the ultra-high rate is a key requirement. The high-frequency range can provide abundant broadband spectrum resources and thus has become an important research direction of the new generation mobile communication. Compared with traditional low-frequency range communication, high-frequency range communication has the characteristics of fast attenuation and short communication distance. In order to improve the coverage, beams become the main communication mode in the high-frequency range. Beams can enable signals to be sent in a small angle range and can gather energy. In addition, the antenna size in the high-frequency range is smaller than that in the low-frequency range, which is an advantage to achieve finer beams with massive antennas in the high-frequency range.

In addition to the high-frequency range, the fifth-generation mobile communication system also supports operations in traditional frequency ranges. In the standards of the 3rd Generation Partnership Project (3GPP), the traditional frequency range is called Frequency Range 1 (FR1), which refers to the frequency range of 6 GHz and below, and the high-frequency range is called Frequency Range 2 (FR2), which refers to the frequency range of above 24 GHz. Since wireless communication signals are carried by electromagnetic waves in either the high-frequency range or low-frequency range, it is necessary to consider the limitation of electromagnetic radiation. The electromagnetic radiation of user equipment (UE) in FR1 is generally limited by specific absorption ratio (SAR), in units of watt/kilogram, W/kg; and the electromagnetic radiation in FR2 is limited by power density (PD) or maximum permissible exposure (MPE), in units of watt/square meter, $W/m^2$.

The related testing and power control mechanisms of the electromagnetic radiation of traditional frequency range FR1 have been quite mature. However, the related testing and power control mechanism of the electromagnetic radiation of high-frequency range FR2 are still under study. The major difference between FR2 and FR1 lies in the beam-related characteristics. When signals are sent through beams, whether beams pass through the human body, especially in the near-field range of the transmitting end, has greatly different effects on the limitation of power.

How to make full use of characteristics of beams to flexibly use power in FR2 while satisfying the related testing requirements of the electromagnetic radiation is a problem that cannot yet be solved in the related art.

No effective scheme has yet been proposed for the problem of how to make full use of characteristics of beams to flexibly use power in FR2 in the related art.

SUMMARY

Embodiments of the present disclosure provide a power control method and apparatus, and an electronic device, to at least solve the problem of how to make full use of characteristics of beams to flexibly use power in FR2 in the related art.

According to an embodiment of the present disclosure, a power control method is provided. The method includes the steps described below.

One or more pieces of maximum transmit power-related information are determined.

The one or more pieces of maximum transmit power-related information are sent to a first communication node, where each of the one or more pieces of maximum transmit power-related information is related to a beam or a beam group.

According to another embodiment of the present disclosure, a power control method is further provided. The method includes the steps described below.

Required power of an uplink transmission and actual maximum transmit power of the uplink transmission are determined.

Maximum transmit power-related information is determined according to the required power and the actual maximum transmit power.

The maximum transmit power-related information is sent to a first communication node.

According to another embodiment of the present disclosure, a power control method is further provided. The method includes: receiving pieces of maximum transmit power-related information sent by a second communication node, where each of the pieces of the maximum transmit power-related information is related to a beam or a beam group.

According to another embodiment of the present disclosure, a power control method is further provided. The method includes the step described below.

Maximum transmit power-related information sent by a second communication node is received.

According to another embodiment of the present disclosure, a power control apparatus is further provided. The apparatus includes a first determination module and a first sending module.

The first determination module is configured to determine one or more pieces of maximum transmit power-related information.

The first sending module is configured to send the one or more pieces of maximum transmit power-related information to a first communication node, where each of the one or more pieces of maximum transmit power-related information is related to a beam or a beam group.

According to another embodiment of the present disclosure, a power control apparatus is further provided. The apparatus includes a second determination module, a third determination module, and a second sending module.

The second determination module is configured to determine required power of an uplink transmission and actual maximum transmit power of the uplink transmission.

The third determination module is configured to determine maximum transmit power-related information according to the required power and the actual maximum transmit power.

The second sending module is configured to send the maximum transmit power-related information to a first communication node.

According to another embodiment of the present disclosure, a power control apparatus is further provided. The apparatus includes a first receiving module.

The first receiving module is configured to receive pieces of maximum transmit power-related information sent by a second communication node, where each of the pieces of maximum transmit power-related information is related to a beam or a beam group.

According to another embodiment of the present disclosure, a power control apparatus is further provided. The apparatus includes a second receiving module.

The second receiving module is configured to receive maximum transmit power-related information sent by a second communication node.

According to another embodiment of the present disclosure, a storage medium is further provided. The storage medium has a computer program stored thereon, where the computer program is configured to, when executed, perform the steps in any method embodiment described above.

According to another embodiment of the present disclosure, an electronic device is further provided. The electronic device includes a memory and a processor, where the memory has a computer program stored thereon, and the processor is configured to execute the computer program to perform the steps in any method embodiment described above.

According to the present disclosure, one or more pieces of maximum transmit power-related information are determined, and the one or more pieces of maximum transmit power-related information are sent to a first communication node, where each of the one or more pieces of maximum transmit power-related information is related to a beam or a beam group, thereby solving the problem of how to make full use of characteristics of beams to flexibly use power in FR2 in the related art. The maximum transmit power information is sent to the first communication node so that the first communication node can determine transmission resources, thereby achieving the purpose of making full use of characteristics of beams to flexibly use power in FR2.

DETAILED DESCRIPTION

The present disclosure will be hereinafter described in detail with reference to drawings in conjunction with embodiments. It is to be noted that if not in collision, the embodiments and features therein in the present application may be combined with each other.

It is to be noted that the terms "first", "second" and the like in the description, claims and the preceding drawings of the present disclosure are used to distinguish between similar objects but not necessarily used to describe a particular order or sequence.

Embodiment One

Figure 1:
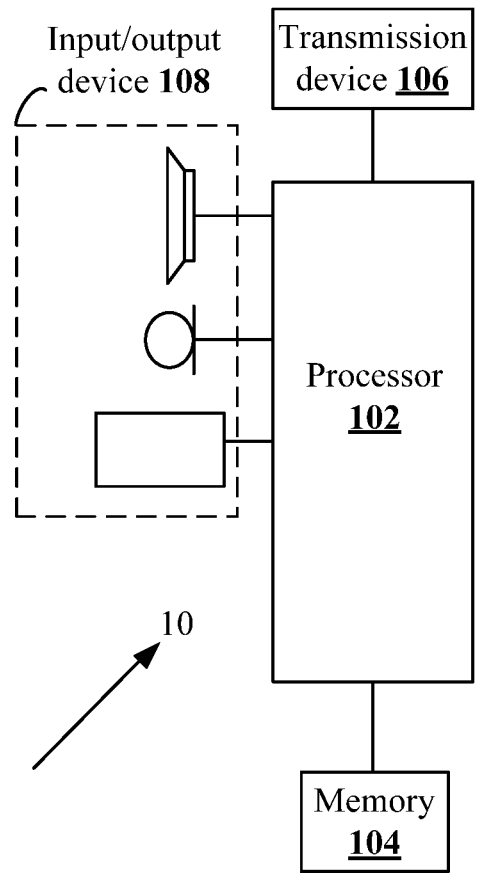
FIG. 1 is a structure block diagram of hardware of a mobile terminal for a power control method according to an embodiment of the present disclosure.

The method embodiment provided in Embodiment one of the present application may be performed in a mobile terminal, a computer terminal or other similar computing apparatuses. The following is illustrated by using an example in which the method is performed in the mobile terminal. FIG. 1 is a structure block diagram of hardware of a mobile terminal for a power control method according to an embodiment of the present disclosure. As shown in FIG. 1, a mobile terminal 10 may include one or more (only one is shown in FIG. 1) processors 102 (the processor 102 may include, but is not limited to, a processing apparatus such as a microprocessor control unit (MCU) or a field programmable gate array (FPGA)) and a memory 104 for storing data. In an embodiment, the preceding mobile terminal may further include a transmission device 106 for implementing a communication function and an input/output device 108. It is to be understood by those of ordinary skill in the art that the structure shown in FIG. 1 is merely illustrative and not intended to limit the structure of the preceding mobile terminal. For example, the mobile terminal 10 may further include more or fewer components than the components shown in FIG. 1 or may have a configuration different from the configuration shown in FIG. 1.

The memory 104 may be configured to store a computer program such as a software program and a module of application software, for example, the computer program corresponding to the power control method in the embodiment of the present disclosure. The processor 102 executes the computer program stored in the memory 104 to perform various functional applications and data processing, that is, to implement the preceding method. The memory 104 may include a high-speed random-access memory and may further include a nonvolatile memory such as one or more magnetic storage apparatuses, flash memories or other nonvolatile solid-state memories. In some examples, the memory 104 may further include memories that are disposed remote from the processor 102. These remote memories may be connected to the mobile terminal 10 via a network. The examples of the preceding network include, but are not limited to, the Internet, an intranet, a local area network, a mobile communication network, and a combination thereof.

The transmission device 106 is configured to receive or send data via a network. Specific examples of the preceding network may include a wireless network provided by a communications provider of the mobile terminal 10. In an example, the transmission device 106 includes a network interface controller (NIC) which may be connected to other network devices via a base station and thus can communicate with the Internet. In an example, the transmission device 106 may be a radio frequency (RF) module which is configured to communicate with the Internet in a wireless manner.

Figure 2:
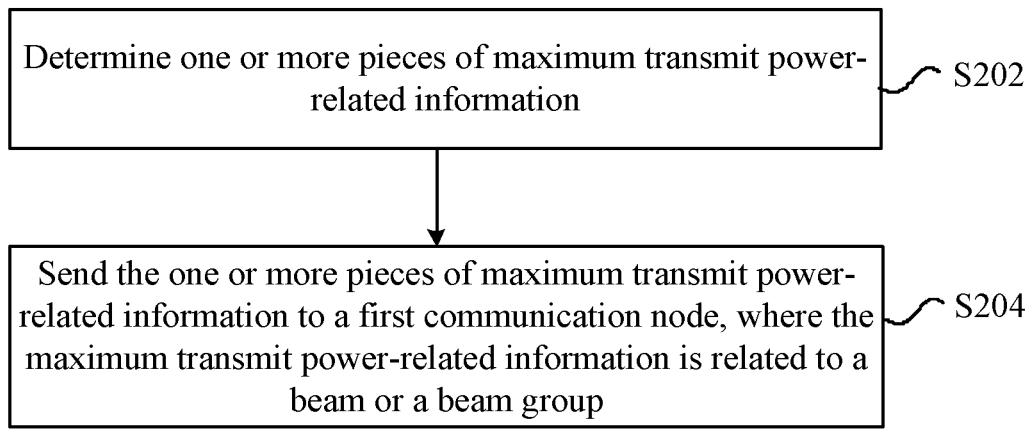
FIG. 2 is a flowchart one of a power control method according to an embodiment of the present disclosure.

The embodiment provides a power control method. The method is applied to the preceding mobile terminal. FIG. 2 is a flowchart one of a power control method according to an embodiment of the present disclosure. As shown in FIG. 2, the flowchart includes the steps described below.

In step S202, one or more pieces of maximum transmit power-related information are determined.

In step S204, the one or more pieces of maximum transmit power-related information are sent to a first communication node, where the maximum transmit power-related information is related to a beam or a beam group.

According to the preceding steps S202 and S204, one or more pieces of maximum transmit power-related information are determined, and the one or more pieces of maximum transmit power-related information are sent to a first communication node, where the maximum transmit power-related information is related to a beam or a beam group, thereby solving the problem of how to make full use of characteristics of beams to flexibly use power in FR2 in the related art. The maximum transmit power information is sent to the first communication node so that the first communication node can determine transmission resources, thereby achieving the purpose of making full use of characteristics of beams to flexibly use power in FR2.

In an embodiment, the maximum transmit power-related information includes at least one of: power management maximum power reduction (P-MPR) information, actual maximum transmit power information or power headroom (PHR) information.

The P-MPR information includes one of: an actual value of P-MPR, indication information indicating whether the value of the P-MPR exceeds a predetermined threshold or indication information indicating that the value of the P-MPR is within a predetermined value interval.

The actual maximum transmit power information includes one of: a value of the actual maximum transmit power, indication information indicating whether the value of the actual maximum transmit power exceeds a predetermined threshold or indication information indicating that the value of the actual maximum transmit power is within a predetermined value interval.

The PHR information includes one of: an actual value of PHR, indication information indicating whether the value of the PHR exceeds a predetermined threshold or indication information indicating that the value of the PHR is within a predetermined value interval.

In an embodiment, the maximum transmit power-related information is determined according to at least one of: a transmission parameter or P-MPR information of the beam or the beam group corresponding to the maximum transmit power-related information.

The transmission parameter refers to a related parameter of an uplink transmission sent by a UE. The transmission includes one of: physical uplink shared channel (PUSCH) transmission, physical uplink control channel (PUCCH) transmission or sounding reference signal (SRS) transmission. The transmitted parameters include transmitted resources, such as a time domain, a frequency domain, a spatial domain, a code domain, a beam and other parameters, further includes coding-related parameters such as a modulation and coding mode, a transmission rate, a multi-antenna transmission-related parameter, and further includes a power control parameter. The transmission parameter may refer to information indicated to a UE by a base station in downlink control information (DCI) and a parameter configured for high-layer radio resource control (RRC) information.

In an embodiment, if the maximum transmit power-related information is based on real transmission, the step in which one or more pieces of maximum transmit power-related information are determined includes at least one of the steps described below.

The maximum transmit power-related information being based on real transmission means that when the maximum transmit power-related information is calculated, there is real transmission in a cell to which the maximum transmit power-related information belongs. The real transmission is an uplink transmission, which may be PUSCH transmission scheduled by the base station using uplink (UL) grant information contained in the DCI, PUSCH transmission configured by RRC signaling, PUSCH transmission triggered by the combination of RRC signaling configuration and DCI signaling, PUCCH transmission or SRS transmission.

P-MPR information related to the beam or the beam group is determined according to the beam or the beam group corresponding to the maximum transmit power-related information.

Another maximum power reduction (MPR) is determined according to a parameter of the real transmission, and actual maximum transmit power information related to the beam or the beam group is determined according to the another MPR and P-MPR information related to the beam or the beam group.

Required power is determined according to a parameter of the real transmission, and PHR information related to the beam or the beam group is determined according to the required power and actual maximum transmit power information related to the beam or the beam group.

Required power is determined according to a parameter of the real transmission and the beam or the beam group corresponding to the maximum transmit power-related information, and PHR information related to the beam or the beam group is determined according to the required power and the actual maximum transmit power information related to the beam or the beam group.

The step in which required power is determined according to a parameter of the real transmission and the beam or the beam group corresponding to the maximum transmit power-related information means that beam-related parameters among parameters of the real transmission are replaced with beams or beam groups corresponding to the maximum transmit power-related information, and the required power is determined according to the part of replaced parameters of the real transmission. For example, among PUSCH transmission parameters, SRS resource indicators (SRIs) are associated with power control parameters. Assuming that SRI1 and SRI2 constitute an uplink candidate beam set, both SRI1 and SRI2 correspond to a set of power control parameters. It is assumed that the beam-related information of the pieces of maximum transmit power-related information correspond to SRI1 and SRI2, respectively. For a certain PUSCH transmission, the base station enables the UE to obtain an SRI related to this transmission by using various manners, and the UE determines a transmit resource according to the SRI. For example, if the determined SRI is SRI1, the UE sends the PUSCH by using a spatial relation used when SRS transmission corresponding to SRI1 is sent or by sending a filter parameter. When the maximum transmit power-related information corresponding to SRI1 is reported, the required power may be calculated by using all the parameters of the preceding real PUSCH transmission. When the maximum transmit power-related information corresponding to SRI2 is reported, the required power may be calculated by using the part of the parameters of the real PUSCH transmission, that is, non-beam-related parameters of the real transmission. For the beam-related parameters, SRI1 needs to be replaced with SRI2, that is, the UE obtains another set of power control parameters through SRI2 for calculating the maximum transmit power-related information corresponding to the SRI. The preceding set of power control parameters includes at least one of: an open-loop power control parameter, a closed-loop power control parameter or a path loss (PL) power control parameter. The open-loop power control parameter includes target receive power PO and/or path loss compensation factor alpha. The closed-loop power control parameter is used for indicating at least a closed-loop power control number. The path loss power control parameter is used for determining a reference signal (RS) resource for measuring the path loss.

The maximum transmit power-related information based on virtual transmission is similar to the maximum transmit power-related information based on real transmission. The beam-related parameters are determined by using beams or beam groups corresponding to the corresponding pieces of maximum transmit power-related information, and a power control parameter of the beam or the beam group corresponding to each of the pieces of maximum transmit power-related information is then obtained based on the beam-related information such as the SRI or the spatial relation. Thereby, the required power of the beam or the beam group corresponding to each of the pieces of maximum transmit power-related information is obtained.

In an embodiment, if the maximum transmit power-related information is based on virtual transmission, the step in which one or more pieces of maximum transmit power-related information are determined includes at least one of the steps described below.

The maximum transmit power-related information being based on virtual transmission means that when the maximum transmit power-related information is calculated, there is no real transmission in a cell to which the maximum transmit power-related information belongs. The virtual transmission is also called reference transmission. That is, when there is no real transmission, it is assumed that there is virtual transmission to calculate the required power. That is, in the power control parameter formula, the data rate-related terms and the resource block allocation-related terms are all 0. When the real maximum transmit power is calculated, other MPR information based on virtual transmission is also 0. In this scheme, P-MPR information cannot be assumed to be 0 when the real maximum transmit power is calculated, and P-MPR information should be the P-MPR value of the beam corresponding to the calculation of the maximum transmit power-related information.

P-MPR information related to the beam or the beam group is determined according to the beam or the beam group corresponding to the maximum transmit power-related information.

Another MPR is determined according to a parameter of the virtual transmission, and actual maximum transmit power information related to the beam or the beam group is determined according to the another MPR and the P-MPR information related to the beam or the beam group.

Required power is determined according to a parameter of the virtual transmission, and PHR information related to the beam or the beam group is determined according to the required power and actual maximum transmit power information related to the beam or the beam group.

Required power is determined according to a parameter of the virtual transmission and the beam or the beam group corresponding to the maximum transmit power-related information, and PHR information related to the beam or the beam group is determined according to the required power and actual maximum transmit power information related to the beam or the beam group.

In an embodiment, the pieces of maximum transmit power-related information are related to all or part of beams or beam groups in a predetermined beam set.

In an embodiment, the predetermined beam set includes one of:
an uplink transmit beam candidate set;
an SRS resource in an SRS resource set;
an SRS resource in an SRS resource set used for codebook-based transmission;
an SRS resource in an SRS resource set used for non-codebook-based transmission;
an SRS resource in an SRS resource set used for beam management; or
a spatial relation set configured for a PUCCH.

In an embodiment, the part of beams or beam groups in the predetermined beam set includes at least one of:
a beam or a beam group, in the predetermined beam set, in which a maximum transmit power-related information value is greater than a first predetermined threshold;
a predetermined number of beams or beam groups in the predetermined beam set, wherein the beams or the beam groups have first maximum transmit power-related information values sorted from large to small; or
a beam or a beam group, in the predetermined beam set, in which a variation of a maximum transmit power-related information value is greater than a second predetermined threshold.

In an embodiment, the maximum transmit power-related information being related to the beam includes one of the following.

Each maximum transmit power-related information corresponds to one transmit beam.

Each maximum transmit power-related information corresponds to a difference between maximum transmit power-related information of a reference transmit beam and maximum transmit power-related information of another transmit beam.

One piece of maximum transmit power-related information corresponds to a reference transmit beam, and each of remaining pieces of maximum transmit power-related information is a difference between maximum transmit power-related information of the reference transmit beam and maximum transmit power-related information of another transmit beam other than the reference transmit beam.

In an embodiment, the one or more pieces of maximum transmit power-related information are determined in a case where at least one of the following conditions is satisfied.

A difference between pieces of maximum transmit power-related information of beams or beam groups in the predetermined beam set is greater than a third predetermined threshold.

A variation amount of a piece of maximum transmit power-related information of a beam or a beam group in the predetermined beam set exceeds a fourth predetermined threshold.

A value of a piece of maximum transmit power-related information determined by a current transmission parameter exceeds a fifth predetermined threshold.

A variation amount of a piece of maximum transmit power-related information determined by a current transmission parameter exceeds a sixth predetermined threshold.

In an embodiment, the step in which the one or more pieces of maximum transmit power-related information are sent to a first communication node includes the step described below.

The maximum transmit power-related information is sent to the first communication node via being carried in a channel state information (CSI) report or PHR information. That is, the maximum transmit power-related information is carried in the PHR information which refers to PHR in a media access control (MAC) control element (CE), or carried in the CSI report.

In an embodiment, the beam includes one of: a spatial relation, a reference signal resource, a synchronization signal resource, an antenna port, an antenna panel, a filter or quasi co-location (QCL) information.

Embodiment Two

Figure 3:
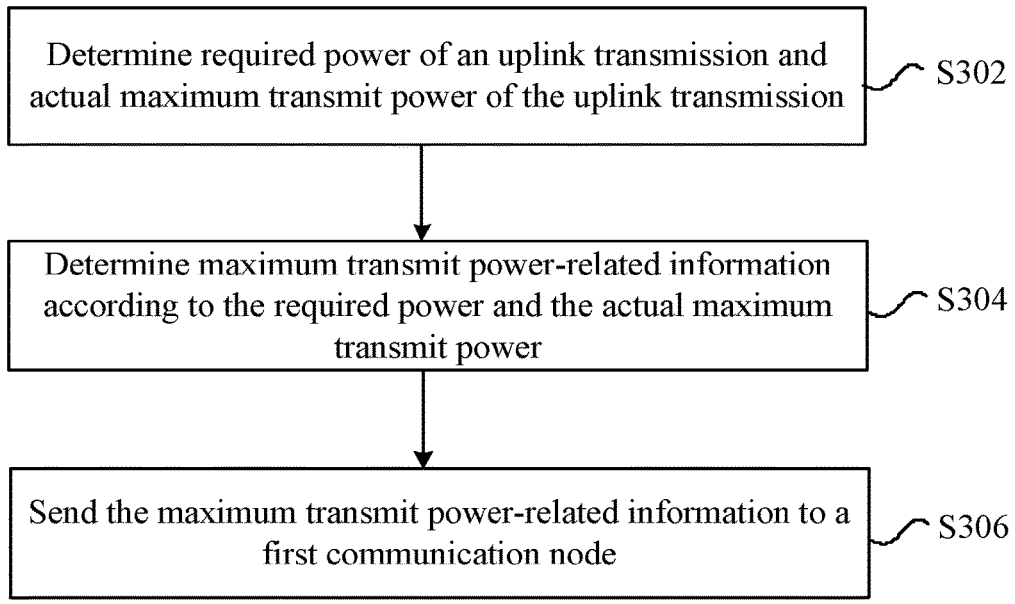
FIG. 3 is a flowchart two of a power control method according to an embodiment of the present disclosure.

The embodiment of the present disclosure further provides a power control method, and the method is applied to a second communication node (that is, the preceding mobile terminal). FIG. 3 is a flowchart two of a power control method according to an embodiment of the present disclosure. As shown in FIG. 3, the flowchart includes the steps described below.

In step S302, required power of an uplink transmission and actual maximum transmit power of the uplink transmission are determined.

In step S304, maximum transmit power-related information is determined according to the required power and the actual maximum transmit power.

In step S306, the maximum transmit power-related information is sent to a first communication node.

According to the preceding steps S302 and S306, required power of an uplink transmission and actual maximum transmit power of the uplink transmission are determined, maximum transmit power-related information is determined according to the required power and the actual maximum transmit power, and the maximum transmit power-related information is sent to a first communication node, thereby solving the problem of how to make full use of characteristics of beams to flexibly use power in FR2 in the related art. The maximum transmit power information is sent to the first communication node so that the first communication node can determine transmission resources, thereby achieving the purpose of making full use of characteristics of beams to flexibly use power in FR2.

In an embodiment, the method further includes: adjusting power of the uplink transmission according to the required power and the actual maximum transmit power.

In an embodiment, the step in which power of the uplink transmission is adjusted according to the required power and the actual maximum transmit power includes the step described below.

The power of the uplink transmission is adjusted by raising a power class in a case where at least one of the following conditions is satisfied.

The required power is greater than the actual maximum transmit power.

A current power class is not the highest power class.

The actual maximum transmit power is determined according to P-MPR.

P-MPR by which the actual maximum transmit power is determined is greater than a first preset value.

P-MPR by which the actual maximum transmit power is determined is higher by a second preset value than a sum of other MPR items other than the P-MPR information by which the actual maximum transmit power is determined.

In an embodiment, the method further includes the step described below.

In a case where at least one of the following conditions is satisfied, a power class is raised and taken as the maximum transmit power-related information.

The required power is greater than the actual maximum transmit power.

A current power class is not the highest power class.

The actual maximum transmit power is determined according to P-MPR.

P-MPR by which the actual maximum transmit power is determined is greater than a first preset value.

P-MPR by which the actual maximum transmit power is determined is higher by a second preset value than a sum of other MPR items by which the actual maximum transmit power is determined.

In an embodiment, the method further includes the step described below.

In a case where at least one of the following conditions is satisfied, a power class is lowered and taken as the maximum transmit power-related information.

A current power class is not the lowest power class.

The required power is lower than actual maximum transmit power corresponding to a power class lower than a current power class.

A difference between the required power and actual maximum transmit power corresponding to a power class lower than a current power class is greater than a third preset value.

In an embodiment, the step in which the maximum transmit power-related information is sent to a first communication node includes one of the steps described below.

The maximum transmit power-related information is sent to the first communication node via being carried in PHR information or an MAC CE.

The maximum transmit power-related information is sent to the first communication node via being borne in a PUCCH or a PUSCH in a form of uplink control information (UCI).

In an embodiment, the maximum transmit power-related information includes one of: power class information or duration ratio information.

In an embodiment, the power class information and the duration ratio information have a predefined association relationship.

In an embodiment, the method further includes at least one of the steps described below.

A duration ratio takes effect from current transmission and extends for at least one predefined time period.

A duration ratio takes effect from current transmission until the duration ratio is updated into a new duration ratio.

If a new second duration ratio is less than a previous first duration ratio, the second duration ratio directly takes effect.

If a second duration ratio is greater than a first duration ratio, the second duration ratio takes effect in at least one predefined time after time when the first duration ratio takes effect.

Embodiment Three

The embodiment of the present disclosure further provides a power control method. The method is applied to a first communication node and includes the step described below.

Pieces of maximum transmit power-related information sent by a second communication node are received, where the maximum transmit power-related information is related to a beam or a beam group.

Further, the first communication node may determine a resource of an uplink transmission of the second communication node according to the maximum transmit power-related information.

In an embodiment, the maximum transmit power-related information includes at least one of:

P-MPR information, actual maximum transmit power information, or PHR information.

In an embodiment, the pieces of maximum transmit power-related information are related to all or part of beams or beam groups in a predetermined beam set.

In an embodiment, the predetermined beam set includes one of:
- an uplink transmit beam candidate set;
- an SRS resource in an SRS resource set;
- an SRS resource in an SRS resource set used for codebook-based transmission;
- an SRS resource in an SRS resource set used for non-codebook-based transmission;
- an SRS resource in an SRS resource set used for beam management; or
- a spatial relation set configured for a PUCCH.

In an embodiment, the part of beams or beam groups in the predetermined beam set includes at least one of:
- a beam or a beam group, in the predetermined beam set, in which a maximum transmit power-related information value is greater than a first predetermined threshold;
- a predetermined number of beams or beam groups in the predetermined beam set, wherein the beams or the beam groups have first maximum transmit power-related information values sorted from large to small; or
- a beam or a beam group, in the predetermined beam set, in which a variation of a maximum transmit power-related information value is greater than a second predetermined threshold.

In an embodiment, the maximum transmit power-related information being related to the beam includes one of the following.

Each maximum transmit power-related information corresponds to one transmit beam.

Each maximum transmit power-related information corresponds to a difference between maximum transmit power-related information of a reference transmit beam and maximum transmit power-related information of another transmit beam.

One piece of maximum transmit power-related information corresponds to a reference transmit beam, and each of remaining pieces of maximum transmit power-related information is a difference between maximum transmit power-related information of the reference transmit beam and maximum transmit power-related information of another transmit beam.

Embodiment Four

The embodiment of the present disclosure further provides a power control method. The method is applied to a first communication node and includes the step described below.

Maximum transmit power-related information sent by a second communication node is received.

Further, the first communication node may determine a resource of an uplink transmission of the second communication node according to the maximum transmit power-related information.

In an embodiment, the maximum transmit power-related information includes one of: power class information or duration ratio information.

In an embodiment, the power class information and the duration ratio information have a predefined association relationship.

Embodiments one to four are described in detail below.

The embodiments of the present disclosure provide power control in a beam scenario. The power control includes the maximum transmit power raise and the maximum transmit power backoff. The maximum transmit power raise is that, when the power is limited, the UE may increase the power within the capability range to perform sending and inform the base station through different information that the UE increases the power so that subsequent scheduling satisfies a constraint condition of an uplink duration ratio. The maximum transmit power backoff is that, when there is a limit of the uplink duration ratio, the UE needs to detect in real time whether the current transmission can use a lowered maximum transmit power class to inform the base station so that the base station relaxes or cancels the constraint of the uplink duration ratio under appropriate conditions. The UE informs the base station that the UE sends P-MPR information related to beams to enable the base station to estimate the real maximum allowed power of each of the beams, to avoid selecting a beam (a beam towards the human body) with large P-MPR to schedule the uplink transmission in a case where the channel conditions are similar.

The second communication node (the UE) sends to the first communication node (the base station) at least one of: maximum transmit power information, duration ratio information, or MPR-related information.

The first communication node determines a transmitted resource for the second communication node according to at least one of pieces of the preceding information.

The maximum transmit power information includes one of: a maximum transmit power class or an indication indicating that a maximum transmit power variation amount exceeds a threshold.

The maximum transmit power class is used for indicating different maximum transmit power. For example, the UE supports multiple power classes, and different power classes correspond to different maximum transmit power classes.

The maximum transmit power variation amount refers to the real maximum transmit power variation amount, that is, the real maximum transmit power value that takes MPR, additional MPR (A-MPR), and P-MPR into consideration. The variation amount exceeding the threshold includes becoming larger and becoming smaller.

The duration ratio information is used for determining the maximum duration that the transmission can occupy within a predefined time period.

The duration ratio information refers to a ratio of the time occupied by the transmission within a predetermined time period to a length of the predetermined time period.

The duration ratio information and the maximum transmit power class have a correspondence.

The higher the maximum transmit power class is, the lower a corresponding time duty cycle is. The time duty cycle corresponding to the lowest maximum transmit power class is 100%, that is, there is no constraint of the space duty cycle.

The MPR-related information includes one of: a P-MPR value, an indication indicating that a P-MPR value exceeds a threshold, a P-MPR value class indication or MPE information.

The MPR-related information is associated with at least one of: a beam resource (group), a spatial relation (group) or a reference signal resource (group).

The association includes that each beam resource (group), each spatial relation (group), and each reference signal resource (group) corresponds to one piece of MPR-related information.

Further, when the uplink and downlink reciprocity hold, the MPR-related information is included in the feedback information of downlink beam management.

Further, the MPE difference is required to be reported only when the MPE difference of several beams is greater than a predetermined threshold.

The MPR-related information corresponding to beams in the entire (partial) beam candidate set is reported.

The maximum transmit power information, the duration ratio information, and the MPR-related information may be carried in a CSI report or a PHR report.

Whether to carry the preceding information or whether to trigger a new CSI/PHR report to carry the preceding information is determined.

The maximum transmit power information and the duration ratio information are reported mainly when a power class/ratio varies.

Whether to carry the MPR-related information is determined according to the following conditions.

The MPR-related information value of a beam in the uplink candidate beam set exceeds a threshold (for the first time).

The MPR-related information value of a beam in the uplink candidate beam set exceeds a threshold (update) with respect to the last reported variation value.

The value change of the actual maximum transmit power $P_{CMAX}$ exceeds a threshold (the power becoming smaller is more urgent, the power becoming larger is less urgent), and the condition of the PHR in the related art is that the change of a PL exceeds a threshold.

The power is close to $P_{CMAX}$.

When the required power of the transmission is higher than the current real maximum transmit power, the maximum transmit power class is raised.

When the required power of the transmission is higher by a first predefined threshold than the current real maximum transmit power, the maximum transmit power class is raised, thereby avoiding the ping-pong switch.

When the required power is higher than the current real maximum transmit power, the maximum transmit power class is raised so that the required power is lower than the real maximum transmit power corresponding to the raised maximum transmit power class, and the maximum transmit power class is raised by one or more classes.

When the required power of the transmission is higher than the current real maximum transmit power and the current maximum power class is not the highest maximum power class, the maximum transmit power class is raised.

When the required power of the transmission is lower than the real maximum transmit power corresponding to the maximum transmit power class that is lower than the current maximum transmit power class, the maximum transmit power class is lowered.

The PL becomes smaller possibly because the channel condition becomes better, or the P-MPR becomes smaller possibly because the beam is changed. The final performance is that the required power is less than the maximum transmit power of one lower class, and thus the duty cycle corresponding to the power of one lower class may be used.

When the required power of the transmission is lower by a second predefined threshold than the real maximum transmit power corresponding to a lower maximum transmit power class, the maximum transmit power class is lowered.

When the required power of the transmission is lower than the real maximum transmit power corresponding to one lower maximum transmit power class or multiple lower maximum transmit power classes, the maximum transmit power class is lowered to this lower maximum transmit power class.

When the required power of the transmission is higher than the current real maximum transmit power and the real maximum transmit power of the current transmission is determined by P-MPR, the maximum transmit power class is raised. The value of the P-MPR is larger than the value of any other MPRs and plays a decisive role. It is considered that the maximum power class may be raised only in the presence of the power shortage caused by the P-MPR factor.

When the required power of the transmission is higher than the current real maximum transmit power, the real maximum transmit power of the current transmission is determined by P-MPR, and the P-MPR is higher than a third threshold, the maximum transmit power class is raised.

When the required power of the transmission is higher than the current real maximum transmit power, the real maximum transmit power of the current transmission is determined by P-MPR, and the P-MPR is higher by a fourth threshold than the sum of other MPR terms, the maximum transmit power class is raised.

The sending of the maximum transmit power information refers to the sending of a new (raised/lowered) maximum transmit power class and/or the sending of duration ratio information corresponding to the new maximum transmit power class.

The transmitted resource includes at least one of a spatial relation or a duration ratio of transmission.

The first communication node determines that the time domain ratio of the transmission of the second communication node is not greater than the duration ratio.

According to the embodiment of the present disclosure, the UE can flexibly process the power of the current transmission within the capability range and inform the base station of relevant information so that the subsequent uplink transmission ratio is constrained and the use requirements of electromagnetic waves are satisfied. The UE can inform the base station so that the base station relaxes or cancels the constraint of the uplink transmission ratio under appropriate conditions. In addition, the UE reports the beam-related P-MPR so that the base station can predict the maximum transmit power of the beam, thereby avoiding scheduling the beam in the direction of human body to send an uplink transmission as much as possible.

In the related communication technologies, when the UE sends an uplink transmission, the UE needs to determine the actual transmit power for the transmission. The determination of the transmit power includes two parts: determining the required power of the transmission, and taking a smaller one of the required power and the maximum allowed power as the actual transmit power.

The determination of the required power to the transmission refers to the operation of obtaining the power by using various power control-related parameters of the transmission. The power control-related parameter includes at least one of: an open-loop power control parameter, a closed-loop power control parameter or a PL parameter. The open-loop power control parameter includes at least one of a target receive power or a PL factor. The power control-related parameter may also include a bandwidth-related power adjustment amount, a rate-related power adjustment amount, and the like.

The maximum allowed power refers to the upper limit of transmit power for a certain transmission, also called the real maximum transmit power or actual maximum transmit power, which is denoted as $P_{CMAX}$. The maximum allowed power is generally determined according to the UE capability, the base station deployment, frequency band information, and other factors.

When the UE determines the maximum transmit power $P_{CMAX}$, the UE first needs to determine an upper limit and a lower limit, and the values between the upper and lower limits are legitimate, as follows:

$$P_{CMAX\_L,c} \leq P_{CMAX,c} \leq P_{CMAX\_H,c}.$$

The upper limit and the lower limit are defined below, respectively.

$$P_{CMAX\_L,c} = \mathrm{MIN}\{P_{EMAX,c} - \Delta T_{C,c}, (P_{PowerClass} - \Delta P_{PowerClass}) - \mathrm{MAX}(MPR_c + A - MPR_c + \Delta T_{IB,c} + \Delta T_{C,c} + \Delta T_{ProSe}, P - MPR_c)\}$$

$$P_{CMAX\_H,c} = \mathrm{MIN}\{P_{EMAX,c}, P_{PowerClass} - \Delta P_{PowerClass}\}$$

The lower corner mark c denotes a parameter for distinguishing cells, indicating cell c.

$P_{EMAX,c}$ is the maximum transmit power that is configured by a network side and is related to a network deployment strategy.

$P_{PowerClass}$ is the maximum transmit power without taking the power deviation tolerance (hereinafter referred to as tolerance) into consideration. Different power classes correspond to different values. At power class 3, this parameter is 23 dBm. At power class 2, this parameter is 26 dBm.

$\Delta P_{PowerClass}$ is that the configuration of the UE in an uplink and downlink ratio is 0 or 6 at power class 2, that is, $P_{PowerClass}$ is further lowered when the uplink occupies more time, with a value of 3 dB, and the value of any other uplink and downlink ratios is 0 dB.

The MPR parameter is designed to take into consideration the factors of the high-order modulation and coding scheme (MCS) and the transmission bandwidth resource block (RB). The higher the modulation order is, the more the maximum transmit power is limited, and the smaller the allowed maximum transmit power is. The more RBs are actually allocated, the more the maximum transmit power is limited, and the smaller the allowed maximum transmit power is.

The A-MPR parameter is designed to take into consideration the additional requirements of specific deployment scenarios. That is, different deployment scenarios or different countries and regions have different requirements for RF transmission. The values in most scenarios are 1 dB to 5 dB, and the values in some scenarios reach 17 dB.

$T_{IB,c}$ is an additional tolerance set for some cells c, whose value is 0 dB or is between 0 dB and 0.9 dB depending on the configuration.

$T_{C,c}$ is set for the upper and lower sidebands, whose value may be 1.5 dB or 0 dB.

$\Delta T_{ProSe}$ is set by taking into consideration a direct communication scenario between users, whose value is 0.1 dB or 0 dB.

$P\text{-}MPR_c$ is the power management maximum power reduction, which is the maximum transmit power reduction amount that is set by taking into consideration the electromagnetic energy absorption, the interference reduction between multiple systems, and other factors.

For convenience of description, in the embodiment of the present disclosure, MPR, A-MPR, $\Delta T_{IB,c}$, $\Delta T_{C,c}$, and $\Delta T_{ProSe}$ are called other maximum power reduction amounts with respect to the P-MPR. The value of $P_{CMAX\_L,c}$ is determined by the larger one of the P-MPR and the sum of other maximum power reduction amounts.

The maximum transmit power of power class 3 in FR1 is 23 dBm, and the factor of electromagnetic wave specific absorption rate (SAR) is reflected by the P-MPR, that is, the UE sets appropriate P-MPR according to various limitations, and the value of the real transmit power does not exceed 23 dBm minus the value of P-MPR. The maximum transmit power of power class 2 in FR1 is 26 dBm, but the maximum transmit power limit of 26 dBm may be used only when the duty cycle of an uplink transmission is relatively low, and only the maximum transmit power limit of 23 dBm may be used when the duty cycle of an uplink transmission is relatively high.

In FR2, the beam is the main communication mode, and factors of whether the transmit beam is towards the human body and the distance of the transmit beam from the human body have greatly different effects on the P-MPR. Related tests show that the P-MPR may reach above 10 dB when the beam towards the human body is used to send uplink signals. Therefore, since the beams in FR2 may be dynamically switched, the P-MPR also needs to adapt to the dynamic switch of beams. In the embodiment of the present disclosure, an enhanced power control method is provided so that the power can be efficiently utilized even in the beam dynamic switch scenarios.

Assuming that the UE may obtain beam-related MPE information, the UE sets appropriate P-MPR of the currently used beam according to the MPE of the beam.

If the UE does not support the ability to dynamically measure the MPE, the beam-related MPE may be statically set. For example, the antenna design of the UE determines the direction of the beam and screen. Assuming that the screen faces the human body in most scenarios, the beam-related MPE may be determined based on the relationship between the beam direction of the UE and the vertical direction of the screen.

If the UE supports the ability to dynamically measure the MPE, the beam-related MPE may be obtained according to a measurement result. For example, the UE detects whether there is a human body in a beam direction and parameters such as the distance from the human body by using special detection means such as infrared equipment, so as to evaluate the MPE in the beam direction.

The UE may at least obtain MPE information of a to-be-sent beam. The UE may obtain MPE information of any beam that may be sent. Alternatively, the UE may obtain MPE information of each beam in a set of to-be-selected uplink transmit beams.

The beam in the embodiment of the present disclosure may also be a spatial relation, a reference signal resource, a synchronization signal resource, an antenna panel, a filter or QCL information.

The beam may be described by using the reference signal resource or synchronization signal resource. For example, the beam may be described by channel state information reference signal (CSI-RS) resource indication information, SRS resource indication information, and synchronization signal block (SSB) indication information.

In the present disclosure, the content illustrated by using the example of beams may be extended to beam groups, and each beam may be replaced by a beam group. The beam group may include multiple reference signal resources or synchronization signal resources.

In the embodiment of the present disclosure, the MPE may also be replaced by PD.

The MPE and the P-MPR have an association relationship. Such an association relationship may be described by using tables. For example, when the value of the MPE is within interval 1, the value of the corresponding P-MPR is predetermined value 1. When the value of the MPE is within interval 2, the value of the corresponding P-MPR is predetermined value 2.

Figure 4:
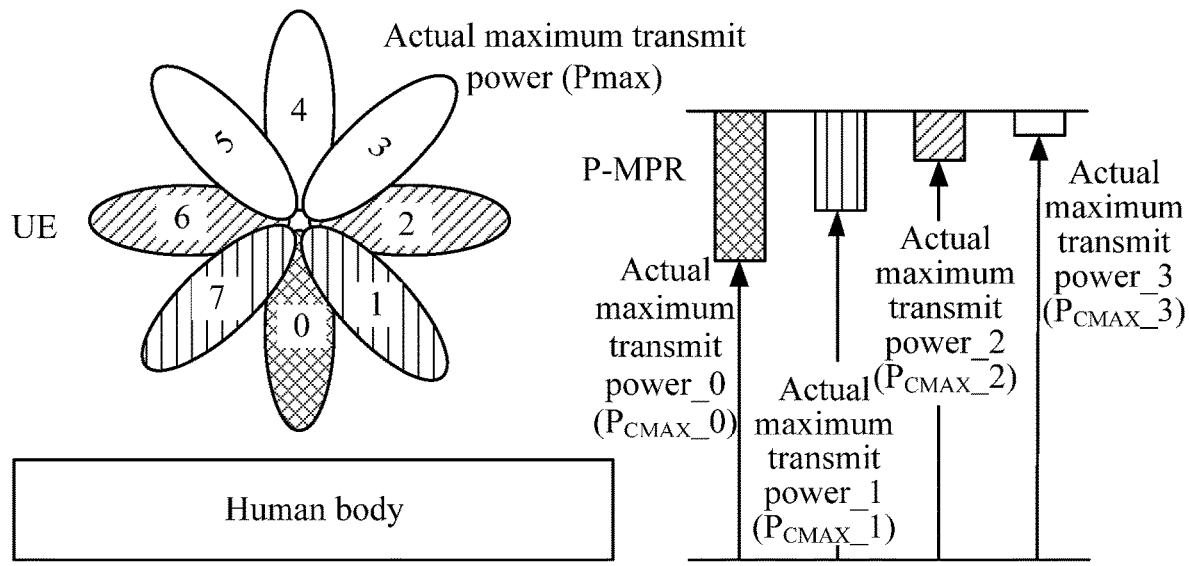
FIG. 4 is a schematic diagram one of an uplink transmission through beams according to an embodiment of the present disclosure.

When the UE communicates with the base station, which beam is used to send an uplink transmission depends on the location of the base station as well as blocks and reflection of the surrounding environment. FIG. 4 is a schematic diagram one of an uplink transmission through beams according to an embodiment of the present disclosure. As shown in FIG. 4, the UE has multiple beam directions labeled as beam 0 to beam 7, respectively. Beam 0 is a beam that faces towards the human body. The beam directions of beam 1 and beam 7 pass through the human body when signals are sent, but due to a certain inclination, the influence of electromagnetic radiation of beam 0 and beam 7 is not as great as that of beam 0. If the influence of electromagnetic radiation on the human body is not considered, all beams are limited to the same maximum transmit power. For example, the same maximum transmit power may be 23 dBm or 23 dBm minus some power reduction amounts. These power reduction amounts include MPR, A-MPR, tolerance, and the like. However, the value of the P-MPR may vary greatly when different MPEs in different beam directions are taken into consideration. The value of the P-MPR in some beam directions is likely to exceed the sum of other MPRs and the tolerance value and thus becomes the main factor that determines the real maximum transmit power. As shown in FIG. 4, the maximum transmit power of beam 0 is lower than the maximum transmit power of beam 3 because the P-MPR of beam 0 is large than the P-MPR of beam 3.

Example One: Uplink Beam Scanning

In the wireless communication system, in order to measure the uplink channel, the base station usually allows the UE to send an uplink reference signal which is called an SRS. In the new radio (NR) system, the SRS-related configuration is implemented at two levels: SRS resource set and SRS resource. One SRS resource may usually represent one beam. In some implementations, it is not excluded that one SRS resource may also represent multiple beams that are simultaneously sent, but these multiple beams that are sent by using one SRS resource are regarded as a beam group, or beams on one logic, or a virtual port. The mapping of the virtual port to an actual physical antenna depends on the implementation of the UE.

One SRS resource set includes at least one SRS resource. The beam scanning at least sends all SRS resources in one SRS resource set. In the process of uplink beam scanning, all SRS resources in one SRS resource set had better to use the same transmit power, which is convenient for the comparison at the receiving end. Therefore, the power control parameters are configured based on the SRS resource set and are applicable to all SRS resources in the SRS resource set. In order to ensure that the power control parameters of multiple SRS resources in the SRS resource set are consistent with each other, the PL used by the first SRS resource in a SRS resource set for sending the SRS is used on all SRS resources in the SRS resource set to calculate power for the sending of the SRS, which can ensure that the required power of each of the multiple SRS resources is the same.

However, the actual transmit power of the uplink transmission is related to both the required power and the real maximum transmit power. In the actual uplink beam scanning process, the beams of some SRS resources may be towards the human body, so the P-MPR is too large, which causes that the real maximum transmit power becomes small, and the SRS transmission in these beam directions is prone to be power limited.

Figure 5:
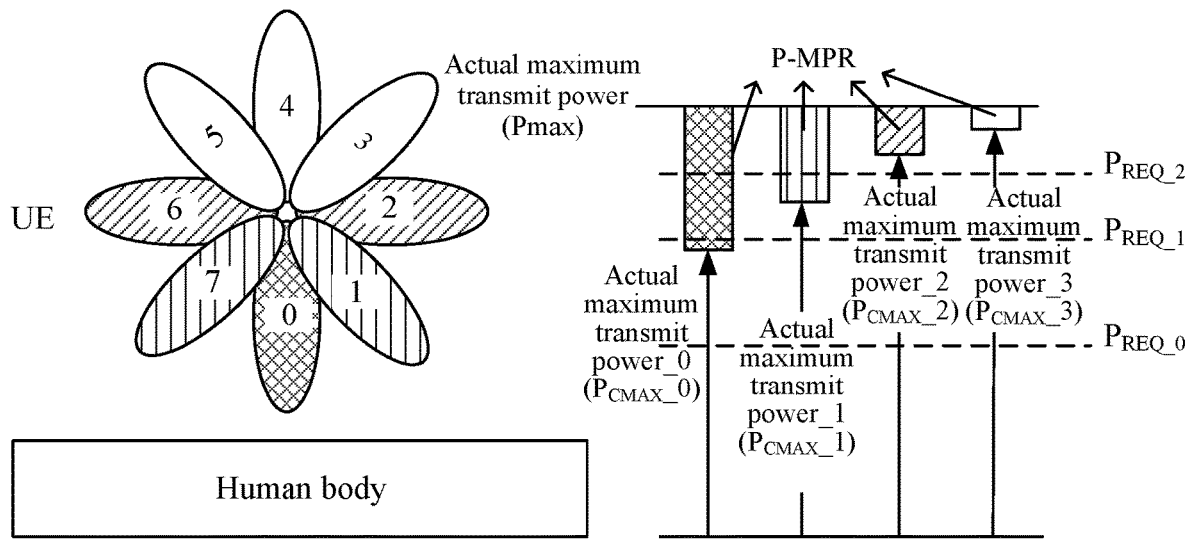
FIG. 5 is a schematic diagram two of an uplink transmission through beams according to an embodiment of the present disclosure.

FIG. 5 is a schematic diagram two of an uplink transmission through beams according to an embodiment of the present disclosure. As shown in FIG. 5, beams 0 to 7 of the UE are used for the uplink beam scanning, and the required power of SRS transmission sent on different beams is the same. When the required power is relatively low, all beams are not limited by power such as PREQ_0 in FIG. 5. When the required power is relatively high, the actual maximum transmit power of a beam with large P-MPR is relatively low, and thus this beam is prone to be power limited such as PREQ_1 and PREQ_2 in FIG. 5.

In view of the problem that the actual transmit power of multiple SRS resources in the same SRS resource set in the same beam scanning process may be different from each other due to different actual maximum transmit power, the analysis is as follows.

One manner is to allow an SRS occupying different SRS resources in one SRS resource set to be transmitted at different transmit power. At this point, from the perspective of the base station on the receiving side, there is a possibility that the power of the transmit beams for multiple SRSs is different. Such unfair transmit power will also affect the subsequent uplink transmission in the same way. After the beam scanning, the base station, when scheduling the uplink transmission PUSCH, uses an SRS resource indicator (SRI) to notify the transmit beam information of the UE. That is, the UE sends the PUSCH transmission by using the same send filter as a send filter for sending the SRS transmission indicated by the SRI. The uplink transmission corresponding to SRS resources which are prone to be power limited is also prone to be power limited.

It is to be noted that this difference in transmit power does not necessarily occur and occurs only when the required transmit power of the SRS exceeds the real maximum transmit power. That is, the UE determines the power for each SRS transmission, and the actual transmit power of different SRSs may become different due to different P-MPR of beams; and the transmit power of SRSs of no beam is limited due to the low required power.

When the power limitation occurs, the UE may not provide any P-MPR of the beams in the beam set for the base station. That is, in the SRS of uplink beam scanning, if the P-MPR causes the power limitation, there is no need to report the beam-related P-MPR. Since the power difference has been reflected in the uplink beam scanning at the transmitting end, it is reasonable for the receiving end to measure based on the different power.

When no power limitation occurs, the UE needs to provide the P-MPR of the beams in the beam set for the base station.

Further, the beam-related P-MPR needs to be reported only when the P-MPR difference between beams is greater than a predetermined threshold.

Further, even if some beams are limited by power, the influence of limitation is very small, and thus the SRS transmission of multiple beams does not reflect obvious power difference, which will affect the determination of the receiving end. Therefore, if any one of several SRSs of the uplink beam scanning is limited by power and exceeds a predetermined threshold, the beam-related P-MPR is not reported.

Another manner is to ensure that an SRS occupying different SRS resources in one SRS resource set is sent at the same transmit power. That is, when the transmit power of multiple SRS resources is different from each other, the preceding purpose is achieved by using one of the following manners.

Manner 1: The transmit power of all SRS resources is consistent with the transmit power of the SRS resource with the lowest transmit power. Alternatively, the transmit power of all SRS resources is determined by using the smallest real maximum transmit power in the SRS resource set.

Manner 2: The transmit power of all SRS resources is consistent with the transmit power of the SRS resource with the highest transmit power. Alternatively, the transmit power of all SRS resources is determined by using the largest real maximum transmit power in the SRS resource set. In this way, due to the different P-MPR of each beam, some SRS resources may exceed the limit of the real maximum transmit power, which is referred to as power over-limit.

Manner 3: The transmit power of all SRS resources is consistent with the transmit power of a first SRS resource in the SRS resource set. Alternatively, the transmit power of all SRS resources is determined by using the real maximum transmit power of the first SRS resource in the SRS resource set. In this way, there may be SRS power over-limit on some beam resources.

Manner 4: The transmit power of all SRS resources is consistent with the transmit power of the SRS resource whose transmit power is median. Alternatively, the transmit power of all SRS resources is determined by using the median real maximum transmit power in the SRS resource set. In this way, there may be SRS power over-limit on some beam resources.

In view of the case of power over-limit, the UE needs to determine whether the required power can be satisfied by using a high maximum transmit power class. With the support of the UE capability, the UE may use a high maximum transmit power class. It is to be noted that even if a high maximum transmit power class is used, the actual maximum transmit power class may not satisfy the required power after the high maximum transmit power class is used and the P-MPR of some beams is subtracted. Then, the actual transmit power is higher than the original transmit power, but the power is still limited. That is, in the preceding Manners 2, 3, and 4, there may also be a possibility that different SRS resources in one SRS resource set cannot be sent at the same power.

If different SRS resources in one SRS resource set are strictly restricted to be sent at the same power, the SRS is not sent on SRS resources whose required power is greater than the real maximum transmit power.

If the UE changes (updates) the maximum transmit power class, the base station needs to be informed of the updated maximum transmit power class, and the base station determines the subsequent uplink transmission according to the duty cycle of the uplink transmission corresponding to the updated maximum transmit power class.

The base station controls the duty cycle of subsequent uplink transmission, which may also affect the time domain density of SRS for beam scanning.

The preceding power over-limit is mainly caused by the low real maximum transmit power due to the large P-MPR. In practical application, the reason why the power is limited may be that the UE is at the edge of the cell. The SRS may also be sent by increasing the maximum transmit power, that is, in the manner of power over-limit, so long as the duty cycle of an uplink transmission is limited.

After the uplink beam training, the UE reports the P-MPR of the uplink transmit beam to the base station, which is helpful for the base station to select beams to form the candidate beam set of the uplink transmission.

Therefore, the uplink beam management process may require the UE to inform the base station of beam-related MPR information.

In addition to the uplink beam management process, the UE also needs to monitor the uplink candidate beam set in real time, and once the UE finds that the MPR information change exceeds a threshold, the UE reports it to the base station. The uplink candidate beam set refers to beams corresponding to all SRS resources in the SRS resource set which are set to be codebook based or non-codebook based.

When at least one of the following conditions is satisfied, the UE informs the base station of the beam-related MPR information.

The difference of pieces of MPR information corresponding to SRS resources belonging to the same SRS resource set is greater than a threshold.

SRS transmission of SRS resources belonging to the same SRS resource set is not power limited.

SRS transmission of SRS resources belonging to the same SRS resource set is power limited, and the power limitation amount is less than a threshold.

When there is an SRS resource in the SRS resource set whose MPR information change exceeds a threshold.

In combination with the preceding manners, that is, in the uplink beam management process, when the preceding related conditions are satisfied, the UE needs to inform the base station of the beam-related MPR information, then the UE needs to monitor the uplink candidate beam set in real time, and once the UE finds that the MPR information exceeds the threshold, the UE reports the beam-related MPR information whose change exceeds the threshold to the base station or reports the MPR information of all SRS resources in the SRS resource set.

The beam-related MPR information and/or power over-limit information is sent to the base station by using at least one of the following manners.

The UE carries the MPR-related information and/or the updated maximum transmit power class in the CSI report.

The MPR-related information and/or the updated maximum transmit power class is carried in the PHR information.

Example Two: Downlink Beam Scanning in the Presence of Reciprocity

The optimal receive beam of the UE in the downlink direction may pass through the human body. If the reciprocity of uplink and downlink is simply taken into consideration, the optimal downlink receive beam is taken as the uplink transmit beam, and the transmit power of an uplink transmission will be greatly limited because of the large P-MPR of the optimal downlink receive beam.

If the base station predicts MPE-related information or P-MPR-related information in the optimal receive beam candidate set in the downlink direction, this factor will be taken into consideration during scheduling, the most suitable beam is selected, and beams that are towards the human body will be avoided.

Therefore, it is necessary for the UE to inform the base station of MPR-related information.

After the downlink beam scanning, the UE selects several best links to report, corresponding to several beams (groups). The UE also reports MPR-related information for each beam (group). Alternatively, for multiple beams, the UE reports an overall indication of whether there is a beam whose MPR-related information exceeds a threshold.

Further, when the reciprocity holds, the MPR-related information is included in the feedback information of a downlink beam.

The reciprocity includes at least one of: uplink and downlink reciprocity, or receiving and sending reciprocity. The uplink and downlink reciprocity means that the beam selection result according to downlink measurement is consistent with the beam selection result of uplink measurement. That is, the uplink and downlink beam selection results can be mutually borrowed, and the beam selection in only one direction is required to be performed. For example, only the uplink beam selection is performed, and the beam selection in the other direction, that is, the downlink beam selection, can borrow the uplink beam selection result. The receiving and sending reciprocity means that for a party of communication, for example, the UE, the best receive beam trained in the downlink direction may be used as the transmit beam in the uplink direction, and likewise, the best transmit beam in the uplink direction may be used as the receive beam in the downlink direction.

After the downlink beam training, the UE reports the P-MPR of the reported beam to the base station, which is helpful for the base station to select beams to form the uplink transmission candidate beams.

The reported beam-related MPR information is determined by using at least one of the following manners.

The UE, when reporting the downlink beam training result, carries MPR information related to all the reported beams.

When the value of P-MPR of reported beams in the downlink beam training result is greater than a threshold, the MPR information related to the beams whose P-MPR is greater than the threshold is reported.

When the P-MPR difference of reported beams in the downlink beam training result is greater than a threshold, the MPR information related to each of the beams is reported.

The beam-related MPR information may be a numerical value of the P-MPR or a predefined class. For example, the P-MPR is divided into three classes, as shown in Table 1.

TABLE 1

| P-MPR class | Value range of represented P-MPR |
| --- | --- |
| 0 | [0, 3) dB |
| 1 | [3, 6) dB |
| 2 | [6, 9) dB |
| 3 | >=9 dB |

The UE carries beam-related MPR information in the CSI report.

Example Three: Uplink Transmission

Through the beam management, the base station selects the appropriate beam or spatial relation for the UE to perform the uplink transmission. For example, after the downlink beam scanning, the UE sends the downlink scanning result to the base station, and when there is uplink and downlink reciprocity between the beams of the UE, the base station may select an appropriate downlink receive beam for the UE to send the uplink transmission. Alternatively, the base station configures resources for the UE to perform the uplink beam management (scanning), and the base station selects, according to the measurement result, an appropriate uplink transmit beam for the UE to send the uplink transmission.

When the base station schedules the beams towards the human body to send the uplink transmission, the real maximum transmit power may possibly be small due to the large P-MPR, which causes that the required power of the uplink transmission cannot be satisfied. If the uplink transmission is sent at this limited power, the received power may be too low to decode correctly, thus wasting precious resources. In order to solve this problem, there are the following schemes.

Scheme 1: The UE is allowed to raise the maximum transmit power class, then increase the real maximum transmit power, and add an uplink duty cycle limit.

The UE needs to inform the base station that the UE increases the maximum transmit power so that the base station may use the uplink duty cycle limit matching the increased maximum transmit power in the subsequent scheduling process.

The UE informs the base station in the following manners.

Manner 1: The UE informs the base station of the maximum transmit power information.

Manner 2: The UE informs the base station of the duration ratio information corresponding to the increased or reduced maximum transmit power.

When the required power of an uplink transmission of the UE is limited and the UE also supports a power class which is higher than the current maximum transmit power class, the UE may raise the maximum transmit power class by at least one class.

For example, the UE supports the maximum transmit power class 0 of 23 dBm and the maximum transmit power class 1 of 26 dBm. When the UE operates in a normal mode, the maximum transmit power class is the maximum transmit power class 0. If the P-MPR is 10 dB and other MPRs and other factors are 3 dB, the real maximum transmit power limit is 13 dBm. For a certain uplink transmission, if the required power of the UE is less than or equal to 13 dBm, the maximum transmit power class 0 can satisfy the required power. If the required power of the UE is 16 dBm, the UE needs to raise the maximum transmit power class to the maximum transmit power class 1 and increases the real maximum transmit power limit by 3 dB and to be 16 dBm. In this way, the required power of the UE can just be satisfied. If the required power of the UE is 18 dBm, the transmission of the UE is limited by power even if the UE raises the maximum transmit power class to the maximum transmit power class 1.

In another example, the UE supports the maximum transmit power class 0 of 23 dBm, the maximum transmit power class 1 of 26 dBm, and maximum transmit power class 2 of 29 dBm. When the UE operates in the normal mode, the maximum transmit power class is the maximum transmit power class 0. If the P-MPR is 10 dB and other MPRs and other factors are 3 dB, the real maximum transmit power limit is 13 dBm. If the required power of the UE is 18 dBm, even if the UE raises the maximum transmit power class by one class, the real maximum transmit power limit is merely 16 dBm, which cannot satisfy the required power. Therefore, the UE may raise the maximum transmit power class to the maximum transmit power class 2, and at this point, the transmit power of the UE is not limited.

Different maximum transmit power classes correspond to different uplink duty cycles. For example, the uplink duty cycle corresponding to the maximum transmit power class 0 is 100%, that is, the ratio in the time domain for the uplink cannot be limited. The uplink duty cycle corresponding to the maximum transmit power class 1 is 50%, that is, the ratio in the time domain for the uplink cannot exceed 50%. The uplink duty cycle corresponding to the maximum transmit power class 2 is 20%, that is, the ratio in the time domain for the uplink cannot exceed 20%.

The above describes the requirements for the UE to increase the maximum transmit power, and when the required power is reduced and the use of the power of a low maximum transmit power class is not limited, the UE needs to lower the maximum transmit power class.

When the UE finds that the required power of the current transmission is less than the current real maximum transmit power limit or that the required power is so small that it exceeds a predetermined threshold, the maximum transmit power class is lowered by one or more classes to find the lowest maximum transmit power class that enables the power to be not limited. After the maximum transmit power class is lowered, the corresponding uplink duty cycle is used.

Such a maximum transmit power class backoff mechanism is suitable for cases in which the channel condition becomes better, the PL becomes smaller, the MPE/P-MPR of beams becomes smaller. In short, the required power becomes smaller, and the maximum transmit power of a lower class may be used.

The above describes that when the power for an uplink transmission is limited, the UE needs to raise the maximum transmit power class and accordingly, needs to inform the base station of the raised maximum transmit power class to limit the subsequent uplink duty cycle, or when the power for an uplink transmission is not limited, the UE may also lower the maximum transmit power class and also needs to inform the base station of the lowered maximum transmit power class to relax the uplink duty cycle or cancel the uplink duty cycle limit.

The UE also needs to monitor the power parameters of the current transmission or the power parameters of the to-be-selected beams, and when at least one of the following conditions is satisfied, the UE reports the P-MPR or PHR to the base station.

The change of the real maximum transmit power of the current transmission exceeds a threshold.

The change of the P-MPR of the current transmission exceeds a threshold.

The change of P-MPR of a candidate beam exceeds a threshold.

The UE carries the reported P-MPR or PHR information in the CSI report.

The UE carries the reported P-MPR in the PHR report.

In addition, the UE is allowed to increase the maximum transmit power, and the UE may not explicitly inform the base station. That is, if the base station schedules or allocates uplink transmission resources for the UE but the UE finds that the uplink transmission duration ratio may exceed the uplink duty ratio corresponding to the increased maximum transmit power if sending the uplink transmission, the UE sends this uplink transmission.

After the UE reports the increase or reduced maximum transmit power to the base station and before the UE receives response information from the base station, the UE controls the duty cycle of the uplink transmission of the UE not to exceed the limit.

In the preceding scenarios, the maximum transmit power is low due to the large P-MPR of the beams towards the human body, which causes that the power is limited. For this problem, the scheme is to break through the current maximum transmit power limit and raise the maximum transmission power class to a higher class. If the UE supports this capability, the application scenario may also be extended to the power limitation problem which is not limited to be caused by the large P-MPR. For example, the power is limited due to other reasons, such as the power limitation of the UE at the edge of the cell. The preceding manner of increasing the maximum transmit power may also be used.

Scheme 2: The UE informs the base station of the P-MPR of each beam, and the base station may predict the difference of the beams. In the case where the difference between beams that are towards the human body and beams that are not towards the human body is not too great, the beams towards the human body need to be avoided from being scheduled.

If the base station knows the P-MPR of the uplink beam in the candidate set, it will be helpful for scheduling in combination with the value of the PHR. Specifically, when the PL is relatively large and the PHR is close to 0, the ceiling of the uplink transmit beam with large P-MPR will be more obvious while the ceiling of the beam with small P-MPR will be less obvious.

In addition, the base station also needs to evaluate the performance difference such as the magnitude of signal to interference plus noise ratio (SINR) without taking the peak of the transmit power between beams into consideration, that is, the transmit power is basically the same when the required power is satisfied, and evaluate, with taking the peak of the transmit power into consideration, the SINR difference that is expected to be caused after the power limit received by different uplink transmission beams is different.

From the perspective of scheduling, the upper power limit of different beams may vary greatly. If the uplink beam scanning has reflected this difference, the scheduling will be more accurate. If the uplink beam scanning does not reflect this difference and the power required by the actual transmission is greater than the SRS, there may be a power bottleneck.

For example, when two uplink beams send SRSs, if there is no power bottleneck, the SRSs are sent at the same power, and there is a little difference for the receiving end. The beam in the human body direction may be slightly better and then selected, which easily causes power limitation.

If the base station also knows the P-MPR of different transmit beams of the UE, the scheduler may perform determination in combination with the PHR.

If the virtual PHR is already relatively small, the beams with large P-MPR should be avoided from being scheduled, or when the receive quality of different beams is estimated, the weighting value of the beam in the human body direction should be set relatively small.

If the PHR is a real PHR, the real PHR may be mainly based on P-MPR or other MPRs. The UE needs to inform the base station whether the real PHR is mainly based on P-MPR.

If the PHR is mainly based on P-MPR and the base station knows that the P-MPR of other beams is smaller than the P-MPR of the current beam, the current beam may be replaced for scheduling or the current beam continues to be used for scheduling yet using the manner of increasing power. If the P-MPR of other beams is similar to the P-MPR of the current beam, the current beam does not need to be replaced for scheduling and continues to be used, the maximum transmit power class is raised, and the duty cycle constraint is increased.

If the UE has raised the power class for pervious uplink transmission and enables the uplink duty cycle constraint, the base station uses a new beam for scheduling.

The UE determines whether the transmission on the new beam is limited by power, and if the transmission on the new beam is not limited by power, the UE further determines whether the maximum transmit power class can fall back to a lower maximum transmit power class. If the transmission on the new beam is still limited by power, the UE further determines whether the maximum transmit power class needs to be further raised or to maintain the current maximum transmit power class.

If the maximum power class is updated, the UE needs to inform the base station of the updated maximum power class and/or the uplink duty cycle corresponding to the updated maximum power class. The base station controls the uplink scheduling to satisfy the uplink duty cycle requirements before and after the updating.

Alternatively, if the maximum power class is updated, the UE controls the actual uplink transmission to satisfy the uplink duty cycle requirements before and after the updating.

Herein, the case in which the base station needs to know the beam-related MPE or PD of the UE is illustrated by using an example of reporting the P-MPR at the beam level. In specific applications, the P-MPR information may also be replaced by the following information: actual maximum transmit power information and PHR information.

Example Four

If the uplink duty cycle is reduced because the P-MPR of the beam is greater than a threshold, then the beam that is towards the human body should be targeted primarily, and the distance will also affect the P-MPR. If a beam that is not towards the human body is used or a beam is far away from the human body, the P-MPR should not be affected. If the UE only informs the base station that the current transmission has been subjected to the power raise but does not inform the base station of the specific value of the beam-related P-MPR, the limitation on the uplink duty cycle should be primarily performed on the same beam resource, that is, the same spatial relation is used, or the transmission called by a spatial relation that has a QCL relationship with the spatial relation of the original transmission is used.

If the base station uses a new transmit resource, in particular, a beam resource, for scheduling, the P-MPR may not be affected by the uplink duty cycle in the time domain. If the new beam resource is a beam that is not towards the human body, the corresponding P-MPR should be relatively small. When the UE determines that the maximum transmit power class can fall back to a lower maximum transmit power class, the UE informs the base station of the corresponding maximum transmit power class information or directly informs the base station of the uplink duty cycle matching the lower maximum transmit power class. When the base station receives the new maximum transmit power class or the uplink duty cycle, the base station restricts the new scheduling with the new duty cycle.

The active time of the uplink duty cycle is determined by using at least one of the following manners.

The uplink duty cycle is extended for at least one predefined time period from the time when the maximum transmit power class is changed, where the at least one predefined time period, for example, is 10 ms, or 5 ms, or multiple subframes.

The uplink duty cycle starts from the time when the maximum transmit power class is changed until the uplink duty cycle is updated.

If a new duty cycle is stricter than the original duty cycle, the new duty cycle may take effect directly. If the new duty cycle is more relaxed than the original duty cycle, the new duty cycle takes effect in at least one predefined time period after the time when the original duty cycle takes effect.

The new duty cycle being stricter than the original duty cycle means that the value of the new duty cycle is less than the value of the original duty cycle. For example, the original duty cycle is 100% while the new duty cycle is 50%.

The new duty cycle being more relaxed than the original duty cycle means that the value of the new duty cycle is greater than the value of the original duty cycle. For example, the original duty cycle is 50% while the new duty cycle is 100%.

For example, at time t0, the UE finds that the actual maximum transmit power determined by the current maximum transmit power class of 23 dBm is insufficient, then determines to raise the maximum transmit power class to 26 dBm, and sends corresponding information to the base station. Assuming that the uplink power duty ratio corresponding to 23 dBm is 100%, that is, the power is not limited, the uplink power duty ratio corresponding to 26 dBm is 50%. After the base station receives the maximum transmit power which is increased by the UE to 26 dBm, the base station determines the uplink duty cycle of 50% for the UE.

At time t1 after time t0, the base station updates the scheduling resource to schedule the UE to send a new uplink transmission, and the updated scheduling resource corresponds to a new beam resource whose P-MPR is very low. The UE finds that the power is not limited when the maximum transmit power class of 23 dBm is used and then informs the base station to adjust the maximum transmit power class to 23 dBm at time t1. The base station, after receiving this information, should adjust the uplink duty cycle of the UE to 100%, that is, the uplink duty cycle is not constrained.

The base station changes the time of the uplink duty cycle of the UE by using at least one of the following manners.

If the uplink duty cycle is extended for at least one predefined time period, such as 10 ms, from the time when the maximum transmit power class is changed, the uplink duty cycle cannot exceed 50% within 10 ms from time t0. If the time difference between t0 and t1 is less than 10 ms, the duty cycle can be relaxed to 100% after time of t0+10 ms. If the time difference between t0 and t1 is greater than or equal to 10 ms, the duty cycle can be relaxed to 100% at time t1.

Alternatively, the uplink duty cycle starts from the time when the maximum transmit power class is changed until the uplink duty cycle is updated. The duty cycle can be updated to 100% at time t1 without taking the case of extending for one predetermined time period into consideration.

Alternatively, the UE does not inform the base station of maximum transmit power class adjustment information and controls the duty cycle of the actually sent an uplink transmission by using the uplink duty cycle corresponding to the maximum transmit power class.

Example Five

If the UE is power limited, the UE may not use the manner of scheduling information (which is contained in grant information) but uses a predefined scheduling manner. That is, when the UE is power limited, the UE reduces the required power by using at least one of the following manners.

Reduce the MCS: For example, when the scheduled MCS is MCS7, the scheduled MCS is lowered to MCS 6.

Reduce the rate: For example, when the scheduled rate is 3/4, the scheduled rate is reduced to 1/2.

Reduce the modulation order: For example, when the scheduled modulation order is 4, that is, 16 quadrature amplitude modulation (QAM), the scheduled modulation order is reduced to 2, that is, quadrature phase shift keying (QPSK).

Use a fixed MCS or modulation order: For example, the lowest MCS or the lowest modulation order that the UE supports is used.

Reduce the scheduled bandwidth: For example, the bandwidth is reduced to ½ of the scheduled bandwidth, or the bandwidth is reduced to ⅓ of the scheduled bandwidth.

As the receiving end of an uplink transmission, the base station needs to perform blind detection. That is, the decoding is performed according to the scheduling manner in the grant information. If the decoding is performed incorrectly, the decoding needs to be performed by using the preceding predefined scheduling manner until the decoding is performed correctly, or if all the possibilities are tried but the decoding is still performed incorrectly, it is determined that the decoding is performed incorrectly.

Example Six

The virtual PHR is calculated according to the P-MPR of 0. For the scenario where the P-MPR of the candidate beams varies greatly, the base station had better to know the P-MPR of each beam.

Therefore, when the virtual PHR is reported, the UE also needs to report the P-MPR of the candidate beams if the P-MPR difference of the candidate beams exceeds a threshold. The UE may report the P-MPR classes of all the candidate beams and may also report several largest beams of the candidate beams and their corresponding P-MPR.

Example Seven

When multiple beams are used at the same time, the power is limited to a relatively low value because the P-MPR in the direction towards the human body is large. The power in other directions is limited to a relatively high value. In the scenario where multiple beams are sent at the same time, the following conditions should be satisfied.

The transmission in each beam direction does not exceed the real maximum transmit power in the respective direction.

The sum of power of the transmission in each beam direction is not greater than the largest real maximum transmit power among the real maximum transmit power in the directions.

From the description of the preceding implementations, it may be understood clearly by those skilled in the art that the method of the embodiment described above may be implemented by means of software plus a necessary general-purpose hardware platform, or may be implemented by hardware. Based on this understanding, the technical schemes of the present disclosure may be embodied in the form of a software product. The computer software product is stored in a storage medium (such as a read-only memory (ROM)/random-access memory (RAM), a magnetic disk or an optical disk) and includes several instructions for enabling a terminal device (which may be a mobile phone, a computer, a server, a network device or the like) to perform the method according to each embodiment of the present disclosure.

Embodiment Five

The embodiment further provides a power control apparatus. The apparatus is configured to implement the embodiments and optional implementations described above. What has been described is not repeated herein. As used below, the term "module" may be software, hardware or a combination of software and hardware capable of implementing predetermined functions. The apparatus described below in this embodiment is implemented by software, but implementation by hardware or by a combination of software and hardware is also possible and conceived.

Figure 6:
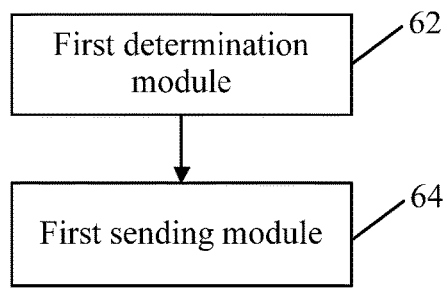
FIG. 6 is a block diagram one of a power control apparatus according to an embodiment of the present disclosure.

FIG. 6 is a block diagram one of a power control apparatus according to an embodiment of the present disclosure. As shown in FIG. 6, the apparatus includes a first determination module 62 and a first sending module 64.

The first determination module 62 is configured to determine one or more pieces of maximum transmit power-related information.

The first sending module 64 is configured to send the one or more pieces of maximum transmit power-related information to a first communication node, where the maximum transmit power-related information is related to a beam or a beam group.

In an embodiment, the maximum transmit power-related information includes at least one of: P-MPR information, actual maximum transmit power information, or PHR information.

In an embodiment, if the maximum transmit power-related information is based on real transmission, the first determination module 62 is configured to perform at least one of the operations described below.

P-MPR information related to the beam or the beam group is determined according to the beam or the beam group corresponding to the maximum transmit power-related information.

Another MPR is determined according to a parameter of the real transmission, and actual maximum transmit power information related to the beam or the beam group is determined according to the another MPR and P-MPR information related to the beam or the beam group.

Required power is determined according to a parameter of the real transmission, and PHR information related to the beam or the beam group is determined according to the required power and actual maximum transmit power information related to the beam or the beam group.

Required power is determined according to a parameter of the real transmission and the beam or the beam group corresponding to the maximum transmit power-related information, and PHR information related to the beam or the beam group is determined according to the required power and the actual maximum transmit power information related to the beam or the beam group.

In an embodiment, if the maximum transmit power-related information is based on virtual transmission, the first determination module 62 is configured to perform at least one of the operations described below.

P-MPR information related to the beam or the beam group is determined according to the beam or the beam group corresponding to the maximum transmit power-related information.

Another MPR is determined according to a parameter of the virtual transmission, and actual maximum transmit power information related to the beam or the beam group is determined according to the another MPR and P-MPR information related to the beam or the beam group.

Required power is determined according to a parameter of the virtual transmission, and PHR information related to the beam or the beam group is determined according to the required power and actual maximum transmit power information related to the beam or the beam group.

Required power is determined according to a parameter of the virtual transmission and the beam or the beam group corresponding to the maximum transmit power-related information, and PHR information related to the beam or the beam group is determined according to the required power and actual maximum transmit power information related to the beam or the beam group.

In an embodiment, the pieces of maximum transmit power-related information are related to all or part of beams or beam groups in a predetermined beam set.

In an embodiment, the predetermined beam set includes one of:
- an uplink transmit beam candidate set;
- an SRS resource in an SRS resource set;
- an SRS resource in an SRS resource set used for codebook-based transmission;
- an SRS resource in an SRS resource set used for non-codebook-based transmission;
- an SRS resource in an SRS resource set used for beam management; or
- a spatial relation set configured for a PUCCH.

In an embodiment, the part of beams or beam groups in the predetermined beam set includes at least one of:
- a beam or a beam group, in the predetermined beam set, in which a maximum transmit power-related information value is greater than a first predetermined threshold;
- a predetermined number of beams or beam groups in the predetermined beam set, wherein the beams or the beam groups have first maximum transmit power-related information values sorted from large to small; or
- a beam or a beam group, in the predetermined beam set, in which a variation of a maximum transmit power-related information value is greater than a second predetermined threshold.

In an embodiment, the maximum transmit power-related information being related to the beam includes one of the following.

Each maximum transmit power-related information corresponds to one transmit beam.

Each maximum transmit power-related information corresponds to a difference between maximum transmit power-related information of a reference transmit beam and maximum transmit power-related information of another transmit beam.

One piece of maximum transmit power-related information corresponds to a reference transmit beam, and each of remaining pieces of maximum transmit power-related information is a difference between maximum transmit power-related information of the reference transmit beam and maximum transmit power-related information of another transmit beam.

In an embodiment, the one or more pieces of maximum transmit power-related information are determined in a case where at least one of the following conditions is satisfied.

A difference between pieces of maximum transmit power-related information of beams or beam groups in the predetermined beam set is greater than a third predetermined threshold.

A variation amount of a piece of maximum transmit power-related information of a beam or a beam group in the predetermined beam set exceeds a fourth predetermined threshold.

A value of a piece of maximum transmit power-related information determined by a current transmission parameter exceeds a fifth predetermined threshold.

A variation amount of a piece of maximum transmit power-related information determined by a current transmission parameter exceeds a sixth predetermined threshold.

In an embodiment, the first sending module 64 is further configured to send the maximum transmit power-related information to the first communication node via carrying the maximum transmit power-related information in a CSI report or PHR information.

In an embodiment, the beam includes one of: a spatial relation, a reference signal resource, a synchronization signal resource, an antenna port, an antenna panel, a filter or QCL information.

Embodiment Six

Figure 7:
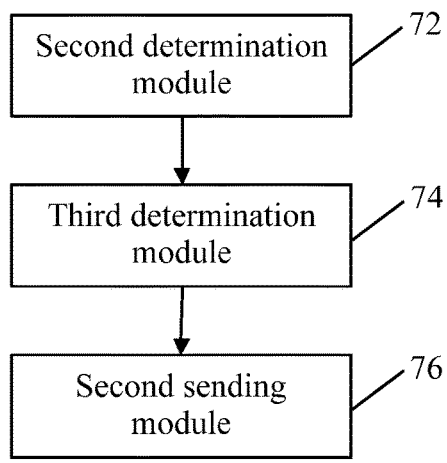
FIG. 7 is a block diagram two of a power control apparatus according to an embodiment of the present disclosure.

The embodiment of the present disclosure further provides a power control apparatus. FIG. 7 is a block diagram two of a power control apparatus according to an embodiment of the present disclosure. As shown in FIG. 7, the apparatus includes a second determination module 72, a third determination module 74, and a second sending module 76.

The second determination module 72 is configured to determine required power of an uplink transmission and actual maximum transmit power of the uplink transmission.

The third determination module 74 is configured to determine maximum transmit power-related information according to the required power and the actual maximum transmit power.

The second sending module 76 is configured to send the maximum transmit power-related information to a first communication node.

In an embodiment, the apparatus further includes an adjustment module.

The adjustment module is configured to adjust power of the uplink transmission according to the required power and the actual maximum transmit power.

In an embodiment, the adjustment module is further configured to adjust the power of the uplink transmission by raising a power class in a case where at least one of the following conditions is satisfied.

The required power is greater than the actual maximum transmit power.

A current power class is not the highest power class.

The actual maximum transmit power is determined according to P-MPR.

P-MPR by which the actual maximum transmit power is determined is greater than a first preset value.

P-MPR by which the actual maximum transmit power is determined is higher by a second preset value than a sum of other MPR items by which the actual maximum transmit power is determined.

In an embodiment, the apparatus further includes a raising module.

The raising module is configured to, in a case where at least one of the following conditions is satisfied, raise a power class and taken the raised power class as the maximum transmit power-related information.

The required power is greater than the actual maximum transmit power.

A current power class is not the highest power class.

The actual maximum transmit power is determined according to P-MPR.

P-MPR by which the actual maximum transmit power is determined is greater than a first preset value.

P-MPR by which the actual maximum transmit power is determined is higher by a second preset value than a sum of other MPR items by which the actual maximum transmit power is determined.

In an embodiment, the apparatus further includes a lowering module.

The lowering module is configured to, in a case where at least one of the following conditions is satisfied, lower a power class and take the lowered power class as the maximum transmit power-related information.

A current power class is not the lowest power class.

The required power is lower than actual maximum transmit power corresponding to a power class lower than a current power class.

A difference between the required power and actual maximum transmit power corresponding to a power class lower than a current power class is greater than a third preset value.

In an embodiment, the second sending module 76 is further configured to perform one of the following operations.

The maximum transmit power-related information is sent to the first communication node via being carried in PHR information or an MAC CE.

The maximum transmit power-related information is sent to the first communication node via being borne in a PUCCH or a PUSCH in a form of UCI.

In an embodiment, the maximum transmit power-related information includes one of: power class information or duration ratio information.

In an embodiment, the power class information and the duration ratio information have a predefined association relationship.

In an embodiment, the apparatus further includes a taking-effect module, which is configured to perform at least one of the operations described below.

A duration ratio takes effect from current transmission and extends for at least one predefined time period.

A duration ratio takes effect from current transmission until the duration ratio is updated into a new duration ratio.

If a new second duration ratio is less than a previous first duration ratio, the second duration ratio directly takes effect.

If a second duration ratio is greater than a first duration ratio, the second duration ratio takes effect in at least one predefined time after time when the first duration ratio takes effect.

Embodiment Seven

The embodiment of the present disclosure further provides a power control apparatus. The apparatus is applied to a first communication node and includes a first receiving module.

The first receiving module is configured to receive pieces of maximum transmit power-related information sent by a second communication node, wherein the maximum transmit power-related information is related to a beam or a beam group.

In an embodiment, the maximum transmit power-related information includes at least one of: P-MPR information, actual maximum transmit power information, or PHR information.

In an embodiment, the pieces of maximum transmit power-related information are related to all or part of beams or beam groups in a predetermined beam set.

In an embodiment, the predetermined beam set includes one of:
  an uplink transmit beam candidate set;
  an SRS resource in an SRS resource set;
  an SRS resource in an SRS resource set used for codebook-based transmission;
  an SRS resource in an SRS resource set used for non-codebook-based transmission;
  an SRS resource in an SRS resource set used for beam management; or
  a spatial relation set configured for a PUCCH.

In an embodiment, the part of beams or beam groups in the predetermined beam set includes at least one of:
  a beam or a beam group, in the predetermined beam set, in which a maximum transmit power-related information value is greater than a first predetermined threshold;
  a predetermined number of beams or beam groups in the predetermined beam set, wherein the beams or the beam groups have first maximum transmit power-related information values sorted from large to small; or
  a beam or a beam group, in the predetermined beam set, in which a variation of a maximum transmit power-related information value is greater than a second predetermined threshold.

In an embodiment, the maximum transmit power-related information being related to the beam includes one of the following.

Each maximum transmit power-related information corresponds to one transmit beam.

Each maximum transmit power-related information corresponds to a difference between maximum transmit power-related information of a reference transmit beam and maximum transmit power-related information of another transmit beam.

One piece of maximum transmit power-related information corresponds to a reference transmit beam, and each of remaining pieces of maximum transmit power-related information is a difference between maximum transmit power-related information of the reference transmit beam and maximum transmit power-related information of another transmit beam.

Embodiment Eight

The embodiment of the present disclosure further provides a power control apparatus. The apparatus is applied to a first communication node and includes a second receiving module.

The second receiving module is configured to receive maximum transmit power-related information sent by a second communication node.

In an embodiment, the maximum transmit power-related information includes one of: power class information or duration ratio information.

In an embodiment, the power class information and the duration ratio information have a predefined association relationship.

It is to be noted that the various modules described above may be implemented by software or hardware. An implementation by hardware may, but may not necessarily, be performed in the following manners: the various modules described above are located in the same processor, or the various modules described above are located in their respective processors in any combination form.

Embodiment Nine

The embodiment of the present disclosure further provides a storage medium. The storage medium has a computer program stored thereon. The computer program is configured to, when executed, perform the steps in any one of the preceding method embodiments.

In an embodiment, in the embodiment, the preceding storage medium may be configured to store a computer program for performing the steps described below.

In step S11, one or more pieces of maximum transmit power-related information are determined.

In step S12, the one or more pieces of maximum transmit power-related information are sent to a first communication node, where the maximum transmit power-related information is related to a beam or a beam group.

In an embodiment, in the embodiment, the preceding storage medium may further be configured to store a computer program for performing the steps described below.

In step S21, required power of an uplink transmission and actual maximum transmit power of the uplink transmission are determined.

In step S22, maximum transmit power-related information is determined according to the required power and the actual maximum transmit power.

In step S23, the maximum transmit power-related information is sent to a first communication node.

In an embodiment, in the embodiment, the preceding storage medium may further be configured to store a computer program for performing the step described below.

In step S31, pieces of maximum transmit power-related information sent by a second communication node are received, where the maximum transmit power-related information is related to a beam or a beam group.

In an embodiment, in the embodiment, the preceding storage medium may further be configured to store a computer program for performing the step described below.

In step S41, maximum transmit power-related information sent by a second communication node is received.

In an embodiment, in the embodiment, the preceding storage medium may include, but is not limited to, a universal serial bus flash disk (USB), an ROM, an RAM, a mobile hard disk, a magnetic disk, an optical disk or another medium capable of storing a computer program.

Embodiment Ten

The embodiment of the present disclosure further provides an electronic device. The electronic device includes a memory and a processor. The memory has a computer program stored thereon. The processor is configured to execute the computer program to perform the steps in any one of the preceding method embodiments.

In an embodiment, the preceding electronic device may further include a transmission device and an input/output device. Both the transmission device and the input/output device are connected to the preceding processor.

In an embodiment, in the embodiment, the preceding processor may be configured to perform the steps below through the computer program.

In step S11, one or more pieces of maximum transmit power-related information are determined.

In step S12, the one or more pieces of maximum transmit power-related information are sent to a first communication node, where the maximum transmit power-related information is related to a beam or a beam group.

In an embodiment, in the embodiment, the processor may further be configured to perform the steps below through the computer program.

In step S21, required power of an uplink transmission and actual maximum transmit power of the uplink transmission are determined.

In step S22, maximum transmit power-related information is determined according to the required power and the actual maximum transmit power.

In step S23, the maximum transmit power-related information is sent to a first communication node.

In an embodiment, in the embodiment, the processor may further be configured to perform the step below through the computer program.

In step S31, pieces of maximum transmit power-related information sent by a second communication node are received, where the maximum transmit power-related information is related to a beam or a beam group.

In an embodiment, in the embodiment, the processor may further be configured to perform the step below through the computer program.

In step S41, maximum transmit power-related information sent by a second communication node is received.

In an embodiment, for specific examples in the embodiment, reference may be made to the examples described in the preceding embodiments and optional implementations. The details are not repeated here.

Apparently, it is to be understood by those skilled in the art that the modules or steps in the present disclosure may be implemented by a general-purpose computing device and may be concentrated on a single computing device or distributed in a network formed by multiple computing devices. In an embodiment, these modules or steps may be implemented by program codes executable by the computing device. Thus, these modules or steps may be stored in a storage device and executed by the computing device. Moreover, in some cases, the illustrated or described steps may be executed in a sequence different from the sequence described herein. Alternatively, these modules or steps may be implemented by being made into integrated circuit modules separately or multiple ones of these modules or steps may be implemented by being made into a single integrated circuit module. Therefore, the present disclosure is not limited to any specific combination of hardware and software.

What is claimed is:

1. A power control method, comprising:
   determining at least one piece of maximum transmit power-related information; wherein the at least one piece of maximum transmit power-related information is related to all or part of beams or beam groups in a predetermined beam set; and
   sending the at least one piece of maximum transmit power-related information to a first communication node, wherein each of the at least one piece of maximum transmit power-related information is related to a beam or a beam group.

2. The method of claim 1, wherein each of the at least one piece of maximum transmit power-related information comprises at least one of:
   power management maximum power reduction (P-MPR) information;
   actual maximum transmit power information; or
   power headroom (PHR) information.

3. The method of claim 2, wherein each of the at least one piece of maximum transmit power-related information is determined according to at least one of:
   a transmission parameter; or
   P-MPR information of the beam or the beam group corresponding to the each of the at least one piece of maximum transmit power-related information.

4. The method of claim 2, wherein in response to each of the at least one piece of maximum transmit power-related information being based on real transmission, determining the at least one piece of maximum transmit power-related information comprises at least one of:
   determining, according to the beam or the beam group corresponding to each of the at least one piece of maximum transmit power-related information, P-MPR information related to the beam or the beam group;
   determining another maximum power reduction (MPR) amount other than a P-MPR amount according to a parameter of the real transmission, and determining actual maximum transmit power information related to the beam or the beam group according to the another MPR amount and P-MPR information related to the beam or the beam group;
   determining required power according to a parameter of the real transmission, and determining PHR information related to the beam or the beam group according to the required power and actual maximum transmit power information related to the beam or the beam group; or
   determining required power according to a parameter of the real transmission and the beam or the beam group corresponding to each of the at least one piece of maximum transmit power-related information, and determining PHR information related to the beam or the beam group according to the required power and actual maximum transmit power information related to the beam or the beam group.

5. The method of claim 2, wherein in response to each of the at least one piece of maximum transmit power-related information being based on virtual transmission, determining the at least one piece of maximum transmit power-related information comprises at least one of:
   determining, according to the beam or the beam group corresponding to each of the at least one piece of maximum transmit power-related information, P-MPR information related to the beam or the beam group;
   determining another MPR amount other than a P-MPR amount according to a parameter of the virtual transmission, and determining actual maximum transmit power information related to the beam or the beam group according to the another MPR amount and P-MPR information related to the beam or the beam group;
   determining required power according to a parameter of the virtual transmission, and determining PHR information related to the beam or the beam group according to the required power and actual maximum transmit power information related to the beam or the beam group; or
   determining required power according to a parameter of the virtual transmission and the beam or the beam group corresponding to each of the at least one piece of maximum transmit power-related information, and determining PHR information related to the beam or the beam group according to the required power and actual maximum transmit power information related to the beam or the beam group.

6. The method of claim 1, wherein the predetermined beam set comprises one of:
   an uplink transmit beam candidate set;
   a sounding reference signal (SRS) resource in an SRS resource set;
   an SRS resource in an SRS resource set used for codebook-based transmission;
   an SRS resource in an SRS resource set used for non-codebook-based transmission;
   an SRS resource in an SRS resource set used for beam management; or
   a spatial relation set configured for a physical uplink control channel (PUCCH).

7. The method of claim 1, wherein the part of beams or beam groups in the predetermined beam set comprise at least one of:
   a beam or a beam group, in the predetermined beam set, in which a maximum transmit power-related information value is greater than a first predetermined threshold;
   a predetermined number of beams or beam groups in the predetermined beam set, wherein the beams or the beam groups have first maximum transmit power-related information values sorted from large to small; or
   a beam or a beam group, in the predetermined beam set, in which a variation amount of a maximum transmit power-related information value is greater than a second predetermined threshold.

8. The method of claim 1, wherein each of the at least one piece of maximum transmit power-related information being related to the beam comprises one of:
   each of the at least one piece of maximum transmit power-related information corresponds to one transmit beam;
   each of the at least one piece of maximum transmit power-related information corresponds to a difference between maximum transmit power-related information of a reference transmit beam and maximum transmit power-related information of another transmit beam other than the reference transmit beam; or
   one piece of maximum transmit power-related information corresponds to a reference transmit beam, and each of remaining pieces of maximum transmit power-related information other than the one piece of maximum transmit power-related information is a difference between maximum transmit power-related information of the reference transmit beam and maximum transmit power-related information of another transmit beam other than the reference transmit beam.

9. The method of claim 1, wherein determining the at least one piece of maximum transmit power-related information in a case where at least one of the following conditions is satisfied:
- a difference between pieces of maximum transmit power-related information of beams or beam groups in the predetermined beam set is greater than a third predetermined threshold;
- a variation amount of a piece of maximum transmit power-related information of a beam or a beam group in the predetermined beam set exceeds a fourth predetermined threshold;
- a value of a piece of maximum transmit power-related information determined by a current transmission parameter exceeds a fifth predetermined threshold; or
- a variation amount of a piece of maximum transmit power-related information determined by a current transmission parameter exceeds a sixth predetermined threshold.

10. The method of claim 1, wherein sending the at least one piece of maximum transmit power-related information to the first communication node comprises:
- sending the at least one piece of maximum transmit power-related information to the first communication node via carrying the at least one piece of maximum transmit power-related information in a channel state information (CSI) report or PHR information.

11. The method of claim 1, wherein the beam comprises one of: a spatial relation, a reference signal resource, a synchronization signal resource, an antenna port, an antenna panel, a filter or quasi co-location information.

12. A power control method, comprising:
- determining required power of an uplink transmission and actual maximum transmit power of the uplink transmission;
- determining maximum transmit power-related information according to the required power and the actual maximum transmit power;
- sending the maximum transmit power-related information to a first communication node; and
- adjusting power of the uplink transmission according to the required power and the actual maximum transmit power.

13. The method of claim 12, wherein adjusting the power of the uplink transmission according to the required power and the actual maximum transmit power comprises:
- adjusting the power of the uplink transmission by raising a power class in a case where at least one of the following conditions is satisfied:
- the required power is greater than the actual maximum transmit power;
- a current power class is not a highest power class;
- the actual maximum transmit power is determined according to power management maximum power reduction (P-MPR) information;
- P-MPR information by which the actual maximum transmit power is determined is greater than a first preset value; or
- P-MPR information by which the actual maximum transmit power is determined is higher by a second preset value than a sum of other maximum power reduction (MPR) items other than the P-MPR information by which the actual maximum transmit power is determined.

14. The method of claim 12, further comprising:
- in a case where at least one of the following conditions is satisfied, lowering a power class and taking the lowered power class as the maximum transmit power-related information:
- a current power class is not a lowest power class;
- the required power is lower than actual maximum transmit power corresponding to a power class lower than a current power class; or
- a difference between the required power and actual maximum transmit power corresponding to a power class lower than a current power class is greater than a third preset value.

15. The method of claim 12, wherein sending the maximum transmit power-related information to the first communication node comprises:
- sending the maximum transmit power-related information to the first communication node via carrying the maximum transmit power-related information in power headroom (PHR) information or a media access control control element (MAC CE); or
- sending the maximum transmit power-related information to the first communication node via bearing the maximum transmit power-related information in a physical uplink control channel (PUCCH) or a physical uplink shared channel (PUSCH) in a form of uplink control information (UCI).

16. The method of claim 12, wherein the maximum transmit power-related information comprises one of: power class information or duration ratio information.

17. The method of claim 16, wherein the power class information and the duration ratio information have a predefined association relationship.

18. An electronic device, comprising a memory and a processor, wherein the memory has a computer program stored thereon, and the processor is configured to execute the computer program to perform:
- determining at least one piece of maximum transmit power-related information; wherein the at least one piece of maximum transmit power-related information is related to all or part of beams or beam groups in a predetermined beam set; and
- sending the at least one piece of maximum transmit power-related information to a first communication node, wherein each of the at least one piece of maximum transmit power-related information is related to a beam or a beam group.

* * * * *